United States Patent [19]

Ito et al.

[11] Patent Number: 5,525,444
[45] Date of Patent: Jun. 11, 1996

[54] ALKALINE SECONDARY BATTERY

[75] Inventors: Takeo Ito, Yokohama; Eiichi Wakai, Kawasaki; Katsuya Kumagai, Yokohama; Kunihiko Miyamoto, Tokyo, all of Japan

[73] Assignee: Toshiba Battery Co., Ltd., Tokyo, Japan

[21] Appl. No.: 490,134

[22] Filed: Jun. 14, 1995

[30] Foreign Application Priority Data

Jun. 27, 1994 [JP] Japan .................................. 6-144318
Jul. 8, 1994 [JP] Japan .................................. 6-157162

[51] Int. Cl.$^6$ ........................................... H01M 4/62
[52] U.S. Cl. ........................................... 429/206; 429/217
[58] Field of Search .............................. 429/206, 212, 429/214, 215, 216, 217

[56] References Cited

U.S. PATENT DOCUMENTS

| | | | |
|---|---|---|---|
| 5,180,646 | 1/1993 | Berger et al. | 429/215 X |
| 5,380,606 | 1/1995 | Itou et al. | 429/217 X |
| 5,415,958 | 5/1995 | Takahashi et al. | 429/217 |
| 5,468,571 | 11/1995 | Fujimoto et al. | 429/217 |

*Primary Examiner*—Anthony Skapars
*Attorney, Agent, or Firm*—Oblon, Spivak, McClelland, Maier & Neustadt

[57] ABSTRACT

An alkaline secondary battery is capable of inhibiting an increase of internal pressure in the charging/discharging cycles and extending life of charging/discharging cycles. This secondary battery comprises, a case, a paste-type positive electrode accommodated in the case and essentially consisting of a conductive substrate filled with a paste containing an active material and a binder, a negative electrode accommodated in the case, a separator interposed between the positive electrode and the negative electrode, and an alkaline electrolyte accommodated in the case, wherein the binder in the positive electrode contains a copolymer consisting of a vinyl alcohol unit and a unit having COOX group, wherein X is an element selected from the group consisting of hydrogen, alkaline metals and alkaline earth metals.

51 Claims, 3 Drawing Sheets

ALKALINE SECONDARY BATTERY

BACKGROUND OF THE INVENTION

1. Field of the Invention

This invention relates to an alkaline secondary battery provided with a paste-type electrode, and in particular to an alkaline secondary battery wherein a binder to be contained in the paste for the paste-type electrode is improved.

2. Description of the Related Art

The alkaline secondary battery is generally constructed such that a group of electrodes comprising a positive electrode and a negative electrode with a separator interposed therebetween, and an alkaline electrolyte are contained in place in a case. A paste-type electrode is utilized for these positive electrode and negative electrode. This paste-type electrode can be prepared for example by the steps of mixing an active material, a binder and water thereby forming a paste, filling the paste into a conductive substrate such as a perforated metal or mesh-like sintered fibrous substrate, and after being dried, molding the substrate.

Since the paste thus prepared is formed of an aqueous dispersion, a binder that has been conventionally employed is a water-soluble binder such as a water-soluble cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) or polyethylene oxide (PEO).

However, if such an aqueous binder is employed together with an active material for example nickel hydroxide $Ni(OH)_2$ particles for preparing a paste-type positive electrode to be used for an alkaline secondary battery, the following problems will be raised. Namely, since this water-soluble binder is poor in flexibility due to its linear structure obtained from the polymerization of sole monomer, and also poor in bonding strength to the nickel hydroxide particles, the capability of this water-soluble binder for retaining the nickel hydroxide particles on the conductive substrate is naturally poor. Therefore, the secondary battery having such a paste-type positive electrode is accompanied with the problem that the nickel hydroxide particles are more likely to be fallen off from the positive electrode in the process of charge and discharge cycles. The nickel hydroxide particles thus fallen off may give rise to another problem that they contact with the negative electrode thereby causing an inner short circuit. Further, since the water-soluble binder is low in viscosity, it is hardly possible to stably disperse the nickel hydroxide particles in the paste. Moreover, since the water-soluble binder is poor in capability for absorbing an alkaline electrolyte, the amount of electrolyte to be held by the positive electrode will be decreased. As a result, the amount of redox reaction between the nickel hydroxide and the nickel oxyhydroxide (NiOOH) to be undergone in the presence of an alkaline electrolyte in the charge and discharge reaction will also be reduced. In particular, since the polyacrylic acid salt mentioned above is extremely poor in capability to absorb a salt-containing solution such as an alkaline electrolyte, the amount of the electrolyte retained by the positive electrode containing the polyacrylic acid salt becomes extremely low. Because of this, the amount of redox reaction is extremely decreased. Due to these problems as mentioned above, the conventional secondary battery is accompanied with problems that the internal pressure is increased in the process of charging/discharging cycles thereby shortening the cycle life of charging/discharging.

On the other hand, if such an aqueous binder is employed for preparing a paste-type negative electrode together with an active material for example hydrogen-absorbing alloy particles, and the negative electrode is used for the manufacture of an alkaline secondary battery, the following problems will be raised. Namely, since this binder swells when it absorbs an alkaline electrolyte, the swelling of the negative electrode is caused in the process of the charging/discharging cycles thereby causing the gas-absorbing capacity thereof to become gradually lowered. Further, the binder is poor in capacity to retain nickel hydroxide particles on a collector, and a paste containing such a binder is also poor in dispersion stability. Accordingly, in such a negative electrode comprising an active material having a larger specific gravity as compared with nickel hydroxide, for example hydrogen-absorbing alloy, the falling amount of the hydrogen-absorbing alloy during the process of charging/discharging cycles becomes more conspicuous, and the dispersion stability of the paste is extremely lowered. Due to these problems as mentioned above, the conventional secondary battery is accompanied with problems that the internal pressure is increased in the process of charging/discharging cycles thereby shortening the cycle life of charging/discharging.

If a paste is to be prepared from a mixture of homopolymers comprising polyvinyl alcohol and polyacrylate, some difficulty will be encountered in obtaining a homogeneous mixture of these polymer, making it very difficult to stably disperse the active material in the paste. Because even though the polyacrylic acid salt is soluble in water, the polyvinyl alcohol has a characteristics that when the molecular weight thereof is increased so as to be useful as a binder, the water-solubility thereof becomes decreased. If an alkaline secondary battery is provided with an electrode prepared from a paste which is poor in dispersion stability, the active material is caused to fall off in the process of the charging/discharging cycles, thereby causing an increase in internal pressure of the battery and shortening the cycle life of charging/discharging.

SUMMARY OF THE INVENTION

Accordingly, the object of the present invention is to provide an alkaline secondary battery having an extended life of charging/discharging cycle by using a binder for a paste-type electrode, which is capable of improving the dispersion stability of an aqueous paste, strongly retaining an active material on an conductive substrate, improving the alkaline electrolyte absorption properties, and avoiding the swelling of electrodes.

Namely, according to the present invention, there is provided an alkaline secondary battery comprising;

a case, a paste-type positive electrode accommodated in the case and essentially consisting of a conductive substrate filled with a paste containing an active material for a positive electrode, a binder and water, a negative electrode accommodated in the case, a separator accommodated in the case in such a manner as to be interposed between the positive electrode and the negative electrode, and an alkaline electrolyte accommodated in the case;

wherein the binder in the positive electrode contains a copolymer consisting of a vinyl alcohol unit and a unit having COOX group, wherein X is an element selected from the group consisting of hydrogen, alkaline metals and alkaline earth metals.

According to the present invention, there is further provided an alkaline secondary battery comprising;

a case, a positive electrode accommodated in the case, a paste-type negative electrode accommodated in the case and essentially consisting of a conductive substrate filled with a paste containing an active material for a negative electrode, a binder and water, a separator accommodated in the case in such a manner as to be interposed between the positive electrode and the negative electrode, and an alkaline electrolyte accommodated in the case;

wherein the binder in the negative electrode contains a copolymer consisting of a vinyl alcohol unit and a unit having COOX group, wherein X is an element selected from the group consisting of hydrogen, alkaline metals and alkaline earth metals.

According to the present invention, there is further provided an alkaline secondary battery comprising;

a case, a paste-type positive electrode accommodated in the case and essentially consisting of a conductive substrate filled with a paste containing an active material for a positive electrode, a binder and water, a paste-type negative electrode accommodated in the case and essentially consisting of a conductive substrate filled with a paste containing an active material for a negative electrode, a binder and water, a separator accommodated in the case in such a manner as to be interposed between the positive electrode and the negative electrode, and an alkaline electrolyte accommodated in the case;

wherein the binder in the positive electrode and the binder in the negative electrode contain a copolymer consisting of a vinyl alcohol unit and a unit having COOX group (wherein X is an element selected from the group consisting of hydrogen, alkaline metals and alkaline earth metals), respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

This invention will be further explained with reference to an alkaline secondary battery (for example, a cylindrical alkaline secondary battery) shown in FIG. 1 as follows.

Figure 1:
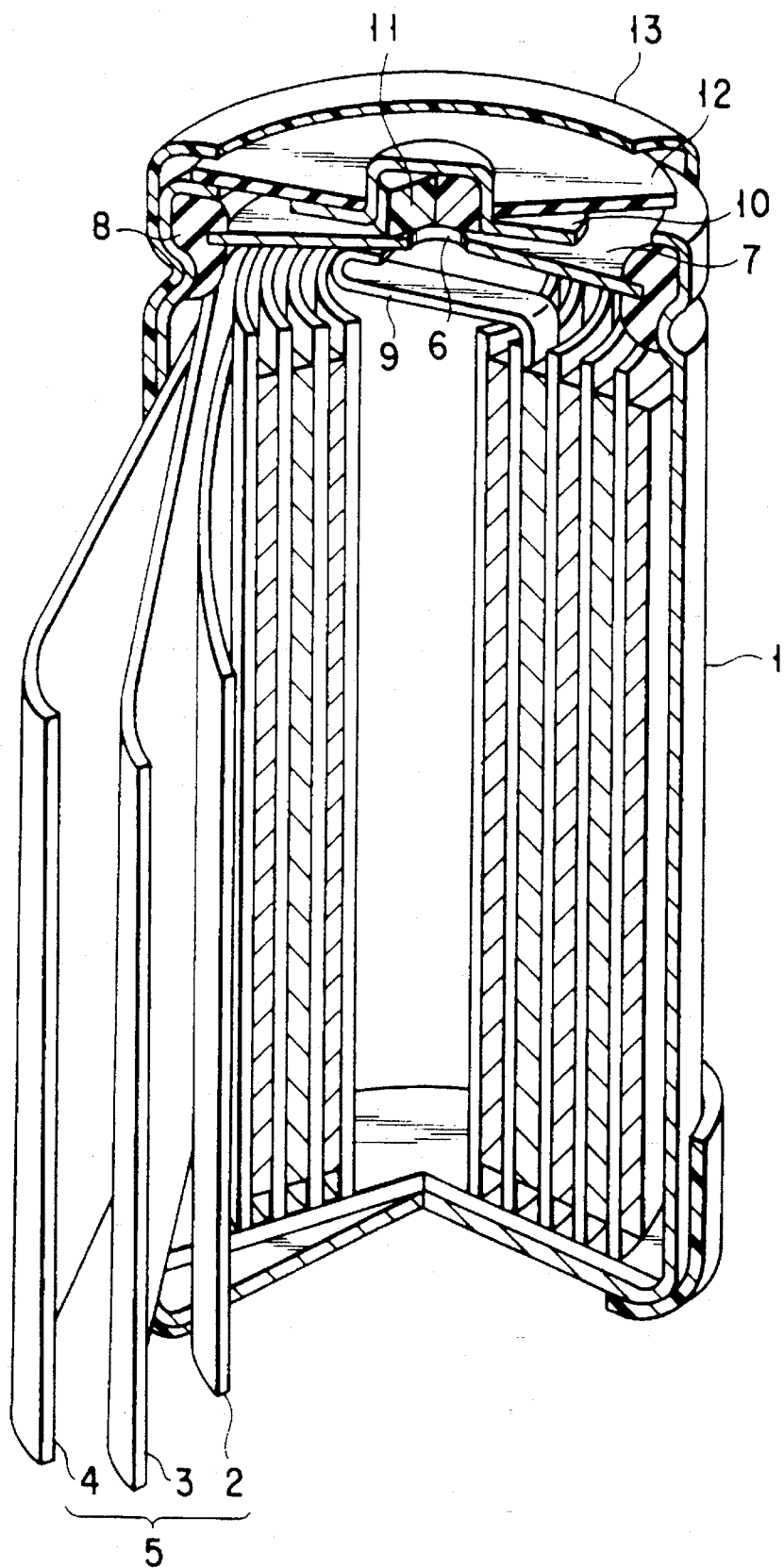
FIG. 1 is a partially sectioned perspective view showing an alkaline secondary battery according to the present invention.

Referring to FIG. 1, a closed-end cylindrical case 1 is accommodated therein with an electrode group 5 which has been manufactured by spirally winding a stacked body consisting of a positive electrode 2, a separator 3 and a negative electrode 4. The negative electrode 3 is disposed at the outermost periphery of the electrode group 5 so as to electrically contact with the cylindrical case 1. The cylindrical case 1 is also filled with an alkaline electrolyte. A sealing plate 7 formed of a disk having an opening 6 at the center is disposed on the upper opening of the cylindrical case 1. An insulating gasket 8 having a ring-like shape is interposed between the periphery of the sealing plate 7 and the upper inner wall surface of the opening of the cylindrical case 1. The peripheral fringe portion of the opening of the cylindrical case 1 is caulked inward so that the first sealing plate 7 is hermetically fixed via the gasket 8 to cylindrical case 1. A positive lead 9 is connected through its one end to the positive electrode 2 and through its other end to the lower surface of the sealing plate 7. A positive terminal 10 having a hat-like shape is mounted over the sealing plate 7 in such a manner as to cover the opening 6. A rubber safety valve 11 is disposed in a space surrounded by the sealing plate 7 and the positive terminal 10 in such a manner as to seal the opening 6. A holding plate 12 formed of an insulating disk having an opening is disposed over the positive terminal 10 in such a manner that the projected portion of the positive terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The positive electrode 2

This positive electrode 2 can be manufactured by the steps of adding a conductive material and a binder to an active material for positive electrode, kneading the resultant mixture to obtain a paste, filling a conductive substrate with the paste thus obtained and, after being dried, subjecting the substrate to a roller press treatment.

Examples of the active material for the positive electrode are nickel compounds such as nickel hydroxide, a nickel hydroxide compound comprising zinc and cobalt which have been coprecipitated together with metallic nickel in the form of a solid solution, and nickel oxides such as nickel monoxide. Among them, the nickel hydroxide compound comprising zinc and cobalt which have been coprecipitated together with metallic nickel is more preferable.

As for the conductive materials, cobalt compounds such as cobalt oxide and cobalt hydroxide, or metallic cobalt can be used.

The conductive substrate may be formed from a mesh-like, sponge-like, fibrous or felt-like metallic porous body made of nickel, stainless steel or nickel-coated metal. Among them, most preferable example is a porous body of a three-dimensional structure of a metal fiber made of a metal selected from the metals exemplified above.

The binder may be at least one copolymer consisting of a vinyl alcohol unit and a unit having COOX group (wherein X is an element selected from the group consisting of hydrogen, alkaline metals and alkaline earth metals), or a mixture of at least one copolymer of the same type and at least one polymer.

Preferable examples of X in the COOX group are hydrogen, sodium, potassium and lithium. Among these examples, sodium is most preferable. The water absorption property of the copolymer can be adjusted by introducing a crosslinking structure into the molecule of the copolymer by copolymerizing a small amount of multi-functional such as bi-functional acrylate.

Examples of unit having the COOX group as mentioned above are acrylic acid, maleic acid, fumaric acid and salts of these acids. Among them, acrylic acid salt and maleic acid are more preferable. A paste comprising a copolymer consisting of a maleic acid unit and a vinyl alcohol unit is capable of stably retaining the viscosity thereof in a storage aging to be performed after the preparation thereof. A copolymer consisting of a vinyl alcohol unit and an acrylic acid unit or an acrylic acid salt unit can be manufactured by copolymerizing acrylate and vinyl acetate, and then saponifying the resultant copolymer. In this case, the copolymer may contain as a copolymer component unreacted acrylate or vinyl acetate.

The copolymer may take form of particles. In this case, it is preferable that the copolymer particles have a cumulative 10% particle diameter $D10$ ranging from 1 to 20 μm and a cumulative 50% particle diameter $D50$ ranging from 5 to 50 μm, with a condition of $D10<D50$ being met. The "cumulative 10% particle diameter $D10$" means the diameter of the largest of the particles which account in numbers for 10% of all particles measured for their diameters and which are smaller than the remaining particles measured, as can be understood from FIG. 2 which shows the distribution of particle diameter. For example, in the case shown in FIG. 2, the $D10$ is 10 μm.

Figure 2:
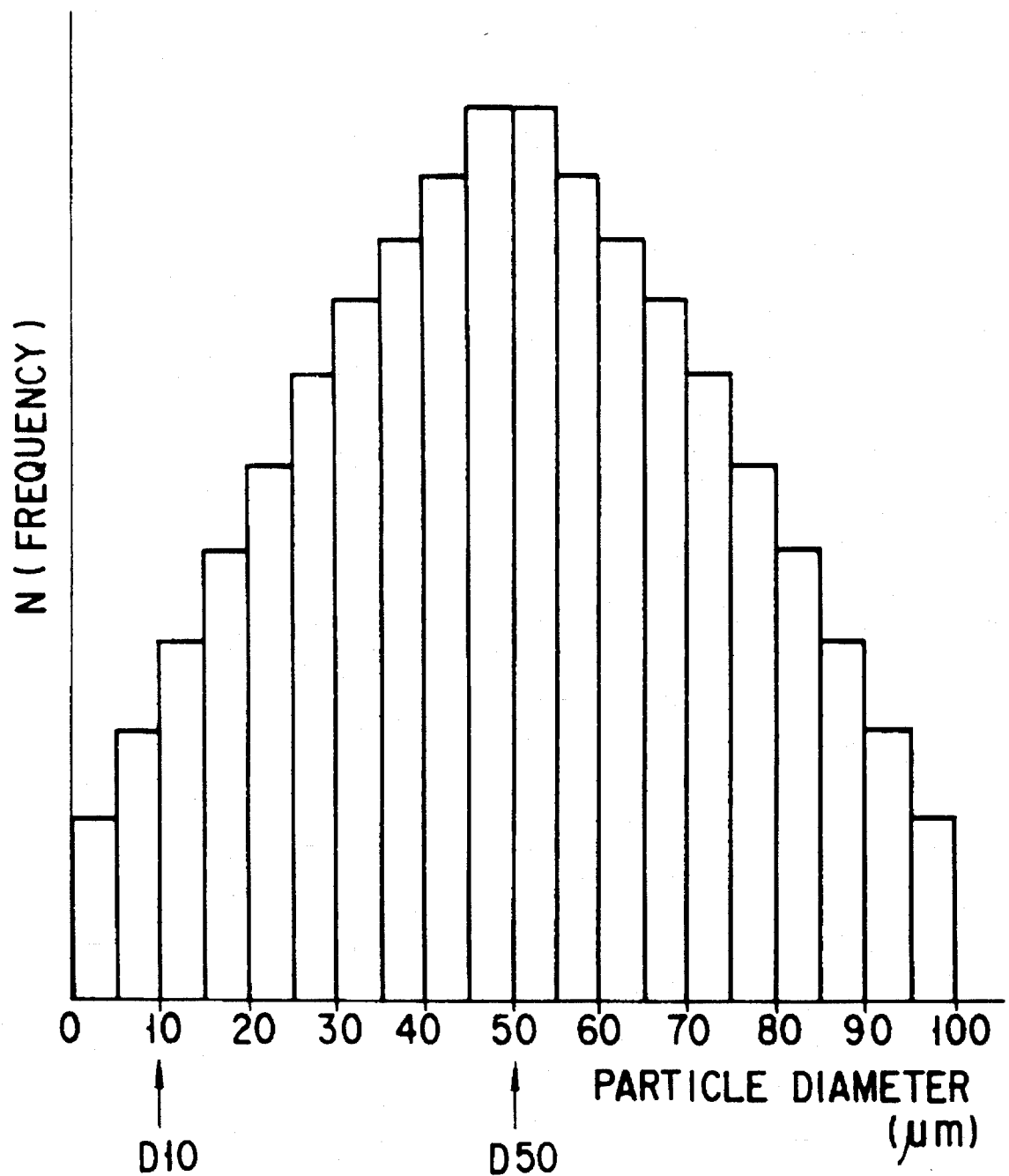
FIG. 2 is a graph showing one example of the particle distribution of particles of copolymer consisting of a vinyl alcohol unit and a unit having COOX group.

The "cumulative 50% particle diameter $D50$" means the diameter of the largest of the particles which account in numbers for 50% of all particles measured for their diameters and which are smaller than the remaining particles measured, as can be understood from FIG. 2 which shows the distribution of particle diameter. The $D50$ is identical to an average diameter of the copolymer particles. For example, in the case shown in FIG. 2, the $D50$ is 50 μm.

Figure 3:
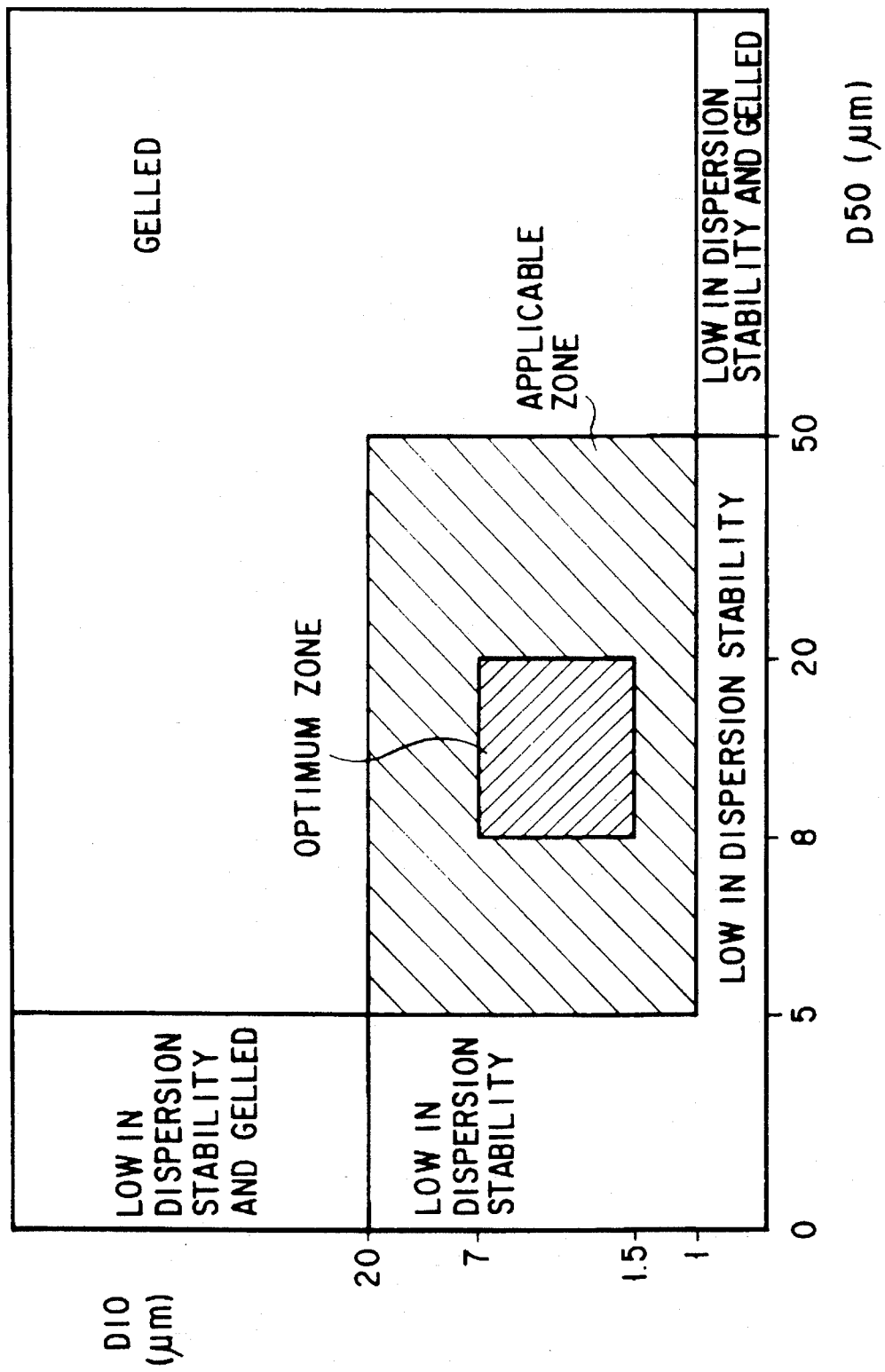
FIG. 3 is a graph showing the relationship between the particle size represented both by a cumulative 10% particle diameter D10 and a cumulative 50% particle diameter D50 and the features of paste.

FIG. 3 is a graph schematically showing the relationship between the particle size represented both by a cumulative 10% particle diameter $D10$ and a cumulative 50% particle diameter $D50$ and the features of paste. The reasons for limiting the ranges of the $D10$ and $D50$ as indicated above will be discussed with reference to FIG. 3. Namely, if the $D10$ is less than 1 μm, the viscosity of the paste is lowered as the paste is formed of a low molecular copolymer thereby giving rise to the lowering of dispersion stability of the paste. On the other hand, if the $D10$ exceeds over 20 μm, the paste may be gelled as the paste is formed of a high molecular copolymer thereby making it difficult to uniformly coating the paste on the conductive substrate. Further, if the $D50$ is less than 5 μm, the viscosity of the paste is lowered as the paste is formed of a low molecular copolymer thereby giving rise to the lowering of dispersion stability of the paste. On the other hand, if the $D50$ exceeds over 50 μm, the paste may be gelled as the paste is formed of a high molecular copolymer thereby making it difficult to uniformly coating the paste on the conductive substrate. In particular, it is more preferable that copolymer particles have $D10$ in the range of 1.5 to 7 μm and $D50$ in the range of 8 to 20 μm and meet the condition of $D10<D50$. The measurement of particle diameter of the copolymer particles can be preferably performed by way of a laser diffraction scattering method.

When the paste is prepared so as to contain a copolymer consisting of a vinyl alcohol unit and a unit having COOX group, and having $D10$ in the range of 1 to 20 μm and $D50$ in the range of 5 to 50 μm with the relationship between $D10$ and $D50$ satisfying the condition of $D10<D50$, it is possible to keep the viscosity thereof in a suitable condition for coating and at the same time to uniformly disperse the active material for positive electrode in the paste. As a result, it is possible to manufacture a positive electrode comprising a conductive substrate filled uniformly with a paste in which the active material is uniformly dispersed, thereby allowing the binder to sufficiently exhibit its excellent active material-retaining property and its excellent water absorption, thus making it possible to realize the manufacture of an alkaline secondary battery having a suitable internal pressure and an excellent cycling performance.

The copolymer consisting of a vinyl alcohol unit and a unit having COOX group is preferably one whose 1 wt. % aqueous solution has a viscosity of 20,000 cp or less. If the viscosity exceeds over 20,000 cp, the paste may be gelled and become difficult to be uniformly coated on the conductive substrate. It is further preferable that the copolymer be one whose 1 wt. % aqueous solution has a viscosity in the range of 500 cp to 10,000 cp. If the viscosity is less than 500 cp, the fluidity of the paste may become too high to be uniformly coated on the conductive substrate. In particular, the copolymer is more preferably one whose 1 wt. % aqueous solution has a viscosity in the range of 1,000 cp to 10,000 cp.

It is also possible to copolymerize a small amount of water repellent monomer (such as styrene and butadiene) in the copolymer consisting of a vinyl alcohol unit and a unit having COOX group for the purpose of adjusting the hydrophilic nature or strength of the copolymer.

Among the copolymers consisting of a vinyl alcohol unit and a unit having COOX group, those having a straight chain structure are suitable for promoting the fluidity of the paste. One example of the copolymer having a straight chain structure is SUMIKA-GEL L-5H (a trade name; Sumitomo Kagaku Kogyo Co., Ltd., which is a copolymer consisting of a vinyl alcohol unit and an acrylic acid unit or an acrylic acid salt unit). On the other hand, a copolymer having a three-dimensional crosslinking structure is more suited in absorbing a larger amount of alkaline electrolyte though poor in solubility in water as compared with a copolymer of straight chain structure. And also the copolymer is high in viscosity because of its structural viscosity. Such a copolymer is capable of forming a stable three-dimensional mesh structure in a paste because of its structural viscosity, so that it is possible to greatly improve the dispersion stability of the paste even with an addition of a little amount of the copolymer. A binder containing the copolymer having a three-dimensional crosslinking structure is more preferable than that containing the copolymer having a straight chain because of the reason that it is capable of improving the dispersion stability of the paste and at the same time retaining a larger amount of alkaline electrolyte in a positive electrode. Examples of the copolymer having a three-dimensional crosslinking structure are a copolymer consisting of a maleic acid unit and a vinyl alcohol unit (AQUA-RESERVE GP, a trade name; Nihon Gosei Kagaku Kogyo Co., Ltd.) and a copolymer consisting of a vinyl alcohol unit and an acrylic acid unit or an acrylic acid salt unit (SUMIKA-GEL S-50, SUMIKA-GEL S-80, SUMIKA-GEL S-100, SUMIKA-GEL SP-510 and SUMIKA-GEL SP-520, each being a trade name; Sumitomo Kagaku Kogyo Co., Ltd.).

It is preferable to adjust the water-absorbing ability of the copolymer having a three-dimensional crosslinking structure to 100 g/g to 800 g/g. A paste containing such a copolymer as a binder is capable of keeping the viscosity thereof in an optimum condition for coating and at the same time capable of uniformly dispersing the active material for positive electrode in the paste. As a result, it is possible to manufacture a positive electrode comprising a conductive substrate filled uniformly with a paste in which the active material is uniformly dispersed, thereby allowing the binder to sufficiently exhibit its excellent active material-retaining property. Further the positive electrode is capable of retaining a large amount of alkaline electrolyte. It is possible to realize the manufacture of an alkaline secondary battery having excellent internal pressure and cycling performances.

The reasons for restricting the water-absorbing ability to the above-mentioned range are as follows.

If the water-absorbing ability is less than 100 g/g, the viscosity of the paste becomes too low causing the fluidity thereof to become too high so that the filling a conductive substrate uniformly with the paste may become difficult. If the water-absorbing ability exceeds over 800 g/g, the paste may be gelled and become difficult to be uniformly coated on the conductive substrate. Therefore, a preferable range of water-absorbing ability of the copolymer is from 300 g/g to 600 g/g.

Examples of the polymer that can be co-used with the copolymers consisting of a vinyl alcohol unit and a unit having COOX group are hydrophobic polymers such as polytetrafluoroethylene (PTFE), polyethylene, polypropylene, and rubber polymers (for example the latex of styrene-butadiene rubber (SBR), the latex of acrylonitril-butadiene rubber (NBR) and the latex of ethylene-propylene-diene monomer (EPDM)); and hydrophilic polymers such as carboxymethyl cellulose (CMC), methyl cellulose (MC), hydroxypropylmethyl cellulose (HPMC), polyacrylate such as sodium polyacrylate (SPA), polyvinyl alcohol (PVA) and polyethylene oxide.

In particular, it is preferable to employ a mixed polymer comprising the hydrophobic polymer and the hydrophilic polymer each exemplified above. Preferable mixed polymers among these mixed polymers are the ones comprising polytetrafluoroethylene and one or more hydrophilic polymer selected from carboxymethyl cellulose, methyl cellulose and polyvinyl alcohol. In this case, the employment of polytetrafluoroethylene is effective in improving the strength of the positive electrode. Meanwhile, the employment of carboxymethyl cellulose, methyl cellulose or polyvinyl alcohol is effective in controlling the fluidity of the paste. Among these hydrophilic polymers, carboxymethyl cellulose is most preferable because of its excellent fluidity adjusting property for the paste. These polyethylene, polypropylene and polytetrafluoroethylene may be employed in the form of dispersion.

It is desirable that when the binder is at least one copolymer, the amount of the binder to be added to the active material is 0.2 to 10 parts by weight per 100 parts by weight of the active material. The reasons for restricting the amount of the binder to this range are as follows. Namely, if the amount is less than the lower limit, i.e. 0.2 part by weight, the capability of retaining the active material on the conductive substrate may possibly be lowered, thereby causing the active material on the conductive substrate to be fallen off in the process of charging/discharging cycles. On the other hand, if the amount exceeds over the upper limit, i.e. 10 parts by weight, it may necessitate an increase in the amount of water to be added to the paste in order to avoid the paste to become more viscous thus giving rise to the lowering of density of active material. Preferable amount of the binder to be added to the active material is 0.3 to 3 parts by weight per 100 parts by weight of the active material.

On the other hand, when the binder is consisted of the mixture at least one copolymer and at least one polymer, desirable amount of the copolymer to be added to the active material is 0.05 to 5 parts by weight per 100 parts by weight of the active material, and desirable amount of the polymer to be added to the active material is 0.1 to 5 by weight per 100 parts by weight of the active material. The reasons for restricting the amount of these copolymer and polymer to these ranges are as follows. Namely, if the amount of the copolymer is less than the lower limit, i.e. 0.05 part by weight, the capability of retaining the active material on the conductive substrate may possibly be lowered. On the other hand, if the amount exceeds over the upper limit, i.e. 5 parts by weight, it may lower the density of active material thereby deteriorating the performance of battery such as the capacity of battery. If the amount of the polymer is less than 0.1 part by weight, it may cause lowerings in fluidity and stability. On the other hand, if the amount of the polymer exceeds over 5 parts by weight, it may give rise to serious troubles in the battery performance such as the lowering of the internal pressure property. More preferable amounts of these copolymer and polymer are as follows. Namely, the copolymer should preferably be added in the ratio of 0.1 to 2.0 parts by weight per 100 parts by weight of the active material, and the polymer should preferably be added in the ratio of 0.3 to 3 parts by weight per 100 parts by weight of the active material.

If a binder comprising a copolymer consisting of a vinyl alcohol unit and a unit having COOX group (wherein X is an element selected from the group consisting of hydrogen, alkaline metals and alkaline earth metals) is to be used as a binder for a negative electrode, the positive electrode may contain the following binders in place of the binders mentioned above.

Examples of such binders are hydrophobic polymers such as polytetrafluoroethylene (PTFE), polyethylene, polypropylene and rubber polymers (for example the latex of stylene-butadiene rubber (SBR), the latex of acrylonitril-butadiene rubber (NBR) and the latex of ethylene-propylene-diene monomer (EPDM)); and hydrophilic polymers such as carboxymethyl cellulose (CMC), methyl cellulose (MC), hydroxypropylmethyl cellulose (HPMC), polyacrylate such as sodium polyacrylate (SPA), polyvinyl alcohol (PVA) and polyethylene oxide.

(2) The negative electrode 4

This negative electrode 4 can be manufactured by the steps of preparing a paste from an active material, a binder and water, filling the resultant paste into an conductive substrate and, after being dried, molding it into a predetermined shape.

As for the active material, either a material which directly takes part in the charging/discharging reaction, or a material which is capable of absorbing and releasing a substance which directly takes part in the charging/discharging reaction can be employed. Examples of the former material are particles of cadmium compounds such as metallic cadmium and cadmium hydroxide. Examples of the latter material are a hydrogen-absorbing alloy which is capable of absorbing and disrobing hydrogen. In particular, a secondary battery provided with a negative electrode containing a hydrogen-absorbing alloy is more excellent as compared with a nickel-cadmium secondary battery in view of the fact that it is capable of discharging of large current and avoiding an environmental pollution.

As for the hydrogen-absorbing alloy, there is no limitation, and any kinds of hydrogen-absorbing alloy can be employed as far as it is capable of absorbing hydrogen gas generated electrochemically in an electrolyte and readily releasing the hydrogen gas thus absorbed at the time of discharge. Examples of the hydrogen-absorbing alloy are $LaNi_5$, $MmNi_5$, (Mm is a misch metal which is a mixture of lanthanoid series elements such as La, Ce, Pt, Nd and Sm), $LnNi_5$, (Ln: a lanthanum-rich misch metal), a multi-element system wherein a portion of Ni of the above mentioned compounds is substituted by an element such as Al, Mn, Co, Ti, Cu, Zn, Zr, Cr and B, or TiNi- or TiFe-based alloy. In particular, a hydrogen-absorbing alloy with composition represented formula $LnNi_xMn_yA_z$, wherein Ln represents lanthanum-rich misch metal, A represents at least one element selected from Al and Co, x, y and z are number which meets the equation of $4.8<x+y+z<5.4$, is preferred since the charge/discharge cycle life can be improved by discouraging grain size reduction which occurs as the charge/discharge cycle proceeds.

If a hydrogen-absorbing alloy is to be employed as a negative electrode, a conductive material may be added to the paste mentioned above. Examples of such a conductive material are particles of nickel, cobalt oxide, titanium oxide and carbon black. Among them, carbon black is more preferable as a conductive material.

Examples of the conductive substrate are a two-dimensional substrate such as a perforated metal, expanded metal, porous copper plate and a nickel net, and a three-dimensional substrate such as a felt-like metallic porous body, a sponge-like metallic substrate and mesh-like sintered metal fabric. Among them, the perforated metal is most preferable.

The binder may be at least one copolymer consisting of a vinyl alcohol unit and a unit having COOX group (wherein X is an element selected from the group consisting of hydrogen, alkaline metals and alkaline earth metals), or a mixture of at least one copolymer of the same type and at least one polymer.

Preferable examples of X in the COOX group are hydrogen, sodium, potassium and lithium. Among these examples, sodium is most preferable. The water absorption property of the copolymer can be adjusted by introducing a crosslinking structure into the molecule of the copolymer by copolymerizing a small amount of multi-functional monomer such as bi-functional acrylate.

Examples of unit having the COOX group as mentioned above are acrylic acid, maleic acid, fumaric acid and salts of these acids. Among them, acrylic acid salt and maleic acid are more preferable. A paste comprising a copolymer consisting of a maleic acid unit and a vinyl alcohol unit is capable of stably retaining the viscosity thereof in a storage aging to be performed after the preparation thereof. A copolymer consisting of a vinyl alcohol unit and an acrylic acid unit or an acrylic acid salt unit can be manufactured by copolymerizing acrylate and vinyl acetate, and then saponifying the resultant copolymer. In this case, the copolymer may contain as a copolymer component unreacted acrylate or vinyl acetate.

The copolymer may take form of particles. In this case, it is preferable that the copolymer particles have a cumulative 10% particle diameter D10 ranging from 1 to 20 µm and a cumulative 50% particle diameter D50 ranging from 5 to 50 µm, with a condition of D10<D50 being met.

When the paste is prepared so as to contain as a binder such a copolymer, it is possible to keep the viscosity thereof in a suitable condition for coating and at the same time to uniformly disperse the active material for negative electrode in the paste. As a result, it is possible to manufacture a negative electrode comprising a conductive substrate filled uniformly with a paste in which the active material is uniformly dispersed, thereby allowing the binder to sufficiently exhibit its excellent active material-retaining property and its low in swelling, thus making it possible to realize the manufacture of an alkaline secondary battery having excellent internal pressure property and cycling performance.

The reasons for limiting the ranges of the D10 and D50 as indicated above will be discussed with reference to FIG. 3. Namely, if the D10 is less than 1 µm, the viscosity of the paste is lowered as the paste is formed of a low molecular copolymer thereby giving rise to the lowering of dispersion stability of the paste. On the other hand, if the D10 exceeds over 20 µm, the paste may be gelled as the paste is formed of a high molecular copolymer thereby making it difficult to uniformly coating the paste on the conductive substrate. Further, if the D50 is less than 5 µm, the viscosity of the paste is lowered as the paste is formed of a low molecular copolymer thereby giving rise to the lowering of dispersion stability of the paste. On the other hand, if the D50 exceeds over 50 µm, the paste may be gelled as the paste is formed of a high molecular copolymer thereby making it difficult to uniformly coating the paste on the conductive substrate. In particular, it is more preferable that a copolymer particles have D10 in the range of 1.5 to 7 µm and D50 in the range of 8 to 20 µm and meet the condition of D10<D50. The measurement of particle diameter of the copolymer particles can be preferably performed by way of a laser diffraction scattering method.

The copolymer consisting of a vinyl alcohol unit and a unit having COOX group is preferably one whose 1wt. % aqueous solution has a viscosity of 20,000 cp or less. If the viscosity exceeds over 20,000 cp, the paste may be gelled and become difficult to be uniformly coated on the conductive substrate. It is further preferable that the copolymer be one whose 1 wt. % aqueous solution has a viscosity in the range of 500 cp to 10,000 cp. If the viscosity is less than 500 cp, the fluidity of the paste may become too high to be uniformly coated on the conductive substrate. In particular, the copolymer is more preferable one whose 1 wt. % aqueous solution has a viscosity in the range of 1,000 cp to 10,000 cp.

It is also possible to copolymerize a small amount of water repellent monomer (such as styrene and butadiene) in the copolymer consisting of a vinyl alcohol unit and a unit having COOX group for the purpose of adjusting the hydrophilic nature or strength of the copolymer.

Among the copolymers consisting of a vinyl alcohol unit and a unit having COOX group, those having a straight chain structure are suitable for promoting the fluidity of the paste. One example of the copolymer having a straight chain structure is SUMIKA-GEL L-5H (a trade name; Sumitomo Kagaku Kogyo Co., Ltd., which is a copolymer consisting of a vinyl alcohol unit and an acrylic acid unit or an acrylic acid salt unit). On the other hand, a copolymer having a three-dimensional crosslinking structure is higher in absorption of alkaline electrolyte though poor in solubility in water as compared with a copolymer of straight chain structure. And also the copolymer is high in viscosity because of its structural viscosity. Such a copolymer is capable of forming a stable three-dimensional mesh structure in a paste because of its structural viscosity, so that is is possible to greatly improve the dispersion stability of the paste even with an addition of a little amount of the copolymer. A binder containing the copolymer having a three-dimensional crosslinking structure is more preferable than that containing the copolymer having a straight chain because of the reason that it is capable of improving the dispersion stability of the paste and at the same time retaining an active material for a negative electrode in a conductive substrate. Examples of the copolymer having a three-dimensional crosslinking structure are a copolymer consisting of a maleic acid unit and a vinyl alcohol unit (AQUA-RESERVE GP, a trade name; Nihon Gosei Kagaku Kogyo Co., Ltd.) and a copolymer consisting of a vinyl alcohol unit and an acrylic acid unit or an acrylic acid salt unit (SUMIKA-GEL S-50, SUMIKA-GEL S-80, SUMIKA-GEL S-100, SUMIKA-GEL SP-510 and SUMIKA-GEL SP-520, each being a trade name; Sumitomo Kagaku Kogyo CO., Ltd.).

It is preferable to adjust the water-absorbing ability of the copolymer having a three-dimensional crosslinking structure to 100 g/g to 800 g/g. A paste containing such a copolymer as a binder is capable of keeping the viscosity thereof in an optimum condition for coating and at the same time capable of uniformly dispersing the active material for negative electrode in the paste. As a result, it is possible to manufacture a negative electrode comprising a conductive substrate filled uniformly with a paste in which the active material is uniformly dispersed, thereby allowing the binder to sufficiently exhibit its excellent active material-retaining property and its low in swelling. To impart excellent characteristic to the secondary battery, the negative electrode needs to hold an amount of electrolyte. To hold an appropriate amount of electrolyte in the negative electrode, the copolymer which can absorb the above-mentioned amount of water may be used as binder. As a result, it is possible to realize the manufacture of an alkaline secondary battery having excellent internal pressure and cycling performances.

The reasons for restricting the water-absorbing ability to the above-mentioned range are as follows.

If the water-absorbing ability is less than 100 g/g, the viscosity of the paste becomes too low causing the fluidity thereof to become too high so that the filling a conductive substrate uniformly with the paste may become difficult. If the water-absorbing ability exceeds over 800 g/g, the paste may be gelled and become difficult to be uniformly coated on the conductive substrate. Therefore, a preferable range of water-absorbing ability of the copolymer is from 300 g/g to 600 g/g.

Examples of the polymer that can be co-used with the copolymers consisting of a vinyl alcohol unit and a unit having COOX group are hydrophobic polymers such as polytetrafluoroethylene (PTFE), polyethylene and polypropylene and rubber polymers (for example the latex of stylene-butadiene rubber (SBR), the latex of acrylonitril-butadiene rubber (NBR) and the latex of ethylene-propylene-diene monomer (EPDM)); and hydrophilic polymers such as carboxymethyl cellulose (CMC), methyl cellulose (MC), hydroxypropylmethyl cellulose (HPMC), polyacrylate such as sodium polyacrylate (SPA), polyvinyl alcohol (PVA) and polyethylene oxide.

In particular, it is preferable to employ one or more hydrophilic polymer selected from carboxymethyl cellulose, methyl cellulose and polyvinyl alcohol. The employment of carboxymethyl cellulose, methyl cellulose or polyvinyl alcohol is effective in controlling the fluidity of the paste. Among these hydrophilic polymers, carboxymethyl cellulose is most preferable because of its excellent fluidity adjusting property for the paste. The polyethylene, polypropylene and polytetrafluoroethylene mentioned above may be employed in the form of dispersion.

It is desirable that when the binder is consisted at least one copolymer, the amount of the binder to be added to the active material is 0.5 to 2.0 parts by weight per 100 parts by weight of the active material. The reasons for restricting the amount of the binder to this range are as follows. Namely, if the amount is less than the lower limit, i.e. 0.5 part by weight, the capability of retaining the active material on the conductive substrate may possibly be lowered. On the other hand, if the amount exceeds over the upper limit, i.e. 2.0 parts by weight, it may cause the lowering of dispersion stability of the paste. In particular, if an active material for negative electrode having a large specific gravity such as a hydrogen-absorbing alloy is used, the agglomeration of the hydrogen-absorbing alloy in the paste may be caused. Preferable amount of the binder to be added to the active material is 0.5 to 1.0 part by weight per 100 parts by weight of the active material.

On the other hand, when the binder is consisted of the mixture at least one copolymer and at least one polymer, desirable amount of the copolymer to be added to the active material is 0.05 to 2.0 parts by weight per 100 parts by weight of the active material, and desirable amount of the polymer to be added to the active material is 0.1 to 3.0 parts by weight per 100 parts by weight of the active material. The reasons for restricting the amount of these copolymer and polymer to these ranges are as follows. Namely, if the amount of the copolymer is less than the lower limit, i.e. 0.05 part by weight, the dispersion stability of the paste may be lowered and at the same time the swelling of negative electrode may possibly be caused in the process of charging/discharging cycles. On the other hand, if the amount exceeds over the upper limit, i.e. 2.0 parts by weight, the decrease in capacity of negative electrode may be caused and at the same time the internal pressure may be increased. If the amount of the polymer is less than 0.1 part by weight, it may cause the lowering in fluidity of the paste thereby making it difficult to fill a conductive substrate uniformly with the paste. On the other hand, if the amount of the polymer exceeds over 3.0 parts by weight, it may give rise to the increase of the internal pressure. More preferable amounts of these copolymer and polymer for improving the dispersion stability of the paste and to prevent the swelling of a negative electrode in the process of charging/discharging are as follows. Namely, the copolymer should preferably be added in the ratio of 0.2 to 0.5 part by weight per 100 parts by weight of the active material, and the polymer should preferably be added in the ratio of 0.1 to 0.125 part by weight per 100 parts by weight of the active material.

If a binder comprising a copolymer consisting of a vinyl alcohol unit and a unit having COOX group (wherein X is an element selected from the group consisting of hydrogen, alkaline metals and alkaline earth metals) is to be used as a binder for a positive electrode, the negative electrode may contain the following binders in place of the binders mentioned above.

Examples of such binders are hydrophobic polymers such as polytetrafluoroethylene (PTFE), polyethylene and polypropylene and rubber polymers (for example the latex of stylene-butadiene rubber (SBR), the latex of acrylonitril-butadiene rubber (NBR) and the latex of ethylene-propylene-diene monomer (EPDM)); and hydrophilic polymers such as carboxymethyl cellulose (CMC), methyl cellulose (MC), hydroxypropylmethyl cellulose (HPMC), polyacrylate such as sodium polyacrylate (SPA), polyvinyl alcohol (PVA) and polyethylene oxide.

(3) The separator 3

The separator 3 may be formed of, a ethylene/vinyl alcohol copolymer nonwoven fabric, a polyolefin (such as polyethylene and polypropylene) nonwoven fabric attached with a hydrophilic functional group and polyamide (such as nylon 6,6) nonwoven fabric. The attachment of a hydrophilic functional group to a polyolefin nonwoven fabric may be carried out any suitable method such as a corona discharge treatment, a sulfonation treatment, a graft copolymerization or a coating with a surfactant or a hydrophilic resin.

(4) Alkaline electrolyte

Examples of the alkaline electrolyte are a potassium hydroxide solution or a mixed solution of potassium hydroxide and lithium hydroxide, a mixed solution of potassium hydroxide and sodium hydroxide, and a mixed solution of potassium hydroxide, sodium hydroxide and lithium hydroxide.

The alkaline secondary battery according to this invention contains, as a binder for a paste-type positive electrode, a copolymer consisting of a vinyl alcohol unit and a unit having COOX group (wherein X is an element selected from the group consisting of hydrogen, alkaline metals and alkaline earth metals).

Since a paste containing the above-mentioned copolymer is excellent in dispersion stability and has an optimum viscosity for coating, a positive electrode manufactured using this paste is capable of keeping an active material uniformly dispersed therein.

Further, since the above-mentioned copolymer is more flexible as compared with the conventional binder comprising a mixture of homopolymers, it is capable of enclosing and holding an active material. Moreover, since the above-mentioned copolymer contains as adsorptive functional group OH group of vinyl alcohol and COOX group, it is capable of containing more various kinds of absorptive functional group as compared with the conventional binder. In addition to this, since the position of these absorptive functional groups adhering onto the active material for positive electrode differ from each other, it is possible to increase the bonding points between the copolymer and the active material. Therefore, a paste-type positive electrode manufactured from a binder comprising the above-mentioned copolymer is capable of strongly retaining the active material on a conductive substrate, so that an alkaline secondary battery provided with the above-mentioned positive electrode is capable of inhibiting the active material from falling out of the positive electrode in the process of charging/discharging cycles.

Further, since the above-mentioned positive electrode is high in capability of absorbing an alkaline electrolyte, the positive electrode comprising the above-mentioned copolymer is capable of retaining a large amount of alkaline electrolyte which is sufficient enough for a charging/discharging reaction.

As explained above, since the positive electrode according to this invention contains as a binder the above-mentioned copolymer, it is possible to realize a uniform dispersion of active material, a decrease in amount of active material falling out of the electrode in the process of charging/discharging cycles and the retention of a large amount of alkaline electrolyte, so that it is possible to provide an alkaline secondary battery which is capable of controlling an increase of the internal pressure to be generated in the process of charging/discharging cycles and extending the life of charging/discharging cycles.

Moreover, the alkaline secondary battery according to this invention contains, as a binder for a paste-type negative electrode, a copolymer consisting of a vinyl alcohol unit and a unit having COOX group (wherein X is an element selected from the group consisting of hydrogen, alkaline metals and alkaline earth metals).

Since a paste containing the above-mentioned copolymer is excellent in dispersion stability and has an optimum viscosity for coating, a negative electrode manufactured using this paste is capable of keeping an active material uniformly dispersed therein.

Further, since the adsorptive functional groups in the above-mentioned copolymer are capable of adhering to various portions of the active material for negative electrode, and since the above-mentioned copolymer is capable of enclosing the active material for negative electrode, the negative electrode containing as a binder the above-mentioned copolymer is capable of strongly retaining an active material on a conductive substrate. In particular, with the use of a binder comprising the above-mentioned copolymer for the preparation of a paste containing an active material having a large specific gravity such as hydrogen-absorbing alloy particles, it has become possible to extensively improve the dispersion stability of the paste, and at the same time to extremely decrease the amount of hydrogen-absorbing alloy particles falling out of the electrode in the process of charging/discharging cycles.

Moreover, since the above-mentioned copolymer barely swells in the occasion of absorbing an alkaline electrolyte, it is possible according to the secondary battery of this invention to inhibit the swelling of the negative electrode containing the above-mentioned copolymer in the process of charging/discharging cycles. As a result, it is possible for the negative electrode to keep an excellent gas-absorption performance for a long period of time.

As explained above, since the negative electrode according to this invention contains as a binder the above-mentioned copolymer, it is possible to realize a uniform dispersion of active material, a decrease in amount of active material falling out of the electrode in the process of charging/discharging cycles and the improvement of gas absorption performance, so that it is possible to provide an alkaline secondary battery which is capable of controlling an increase of the internal pressure to be generated in the process of charging/discharging cycles and extending the life of charging/discharging cycles.

Further, the alkaline secondary battery according to this invention contains, a binder in a positive electrode and a binder in a negative electrode contain a copolymer consisting of a vinyl alcohol unit and a unit having COOX group (wherein X is an element selected from the group consisting of hydrogen, alkaline metals and alkaline earth metals), respectively. The positive electrode containing the above-mentioned copolymer and the negative electrode containing the above-mentioned copolymer have excellent properties as explained above, respectively. It is possible for an alkaline secondary battery provided with such positive and negative electrodes to inhibit an increase of the internal pressure that may be generated in the process of charging/discharging cycles and to greatly extend the life of charging/discharging cycles.

This invention will be further explained with reference to a cylindrical alkaline secondary battery shown in FIG. 1

(1) an alkaline secondary battery provided with a negative electrode comprising as a binder a copolymer consisting of a vinyl alcohol unit and a unit having COOX group EXAMPLES 1 to 15

(Preparation of a paste-type negative electrode)

With the employment of Ln (a lanthanum-rich misch metal comprising 50 wt. % of La, 4 wt. % of Ce, 11 wt. % of Pr and 35 wt. % of Nd), Ni, Co, Mn and Al, a hydrogen-absorbing alloy having a composition of $LnNi_{4.0}Co_{0.4}Mn_{0.3}Al_{0.3}$ was prepared. This hydrogen-absorbing alloy was then pulverized by a mechanical means. 100 parts by weight of the hydrogen-absorbing alloy powder thus prepared was mixed and kneaded with 1.0 part by weight of carbon black, 50 parts by weight of water and a binder thereby preparing a paste. This paste was coated over a perforated metal, and after being dried, press-molded to form a paste-type negative electrode.

As for the binder, particles of copolymer consisting of a sodium acrylate unit and a vinyl alcohol unit were employed alone in the ratios as shown in Table 1, or a mixture of this copolymer particles and at least one kind of compound selected from carboxymethyl cellulose (CMC), methyl cellulose (MC), hydroxypropylmethyl cellulose (HPMC), polyvinyl alcohol (PVA) and sodium polyacrylate (SPA) was employed in the ratios as shown in Table 1.

As for the copolymer particles, SUMIKA-GEL SP-520 (a trade name; Sumitomo Kagaku Kogyo Co., Ltd.) was employed. This copolymer particles were found to have a cumulative 10% particle diameter D10 of 5 μm, and a cumulative 50% particle diameter D50 of 12 μm as measured by way of a laser diffraction scattering method. The water-absorbing ability of this copolymer particles was found to be 500 g/g. Further, when a 1 wt. % aqueous solution was prepared from the copolymer particles, the viscosity of the aqueous solution was found to be 1,500 cp.

(Preparation of a paste-type positive electrode)

To 90 parts by weight of nickel hydroxide powder are added 10 parts by weight of cobalt monoxide, 3.5 parts by weight of polytetrafluoroethylene, 0.15 part by weight of carboxymethyl cellulose and 0.175 part by weight of sodium polyacrylate to obtain a mixture to which 60 parts by weight of demineralized water was added and the mixture was kneaded to prepare a paste. This paste was then filled into a conductive substrate formed of a metallic porous body consisting of nickel-plated fibers and then the same paste was coated over the both surfaces of the substrate. After being dried, the substrate was roll-pressed to obtain a paste-type positive electrode having a thickness of 0.6 mm and a capacity per unit volume of 670 mAH/cc.

A separator formed of polyamide nonwoven fabric was disposed between the negative electrode and the positive electrode, and the resultant composite was spirally wound to form an electrode group. This electrode group was housed in a cylindrical case of AA size, and an electrolyte comprising 7N of KOH and 1N of LiOH was poured into the cylindrical case with the inlet port being sealed, a cylindrical alkaline secondary battery having a capacity of 1,000 mAh and constructed as shown in FIG. 1 was assembled.

EXAMPLES 16 to 30

Negative electrodes constructed in the same manner as in Examples 1 to 15 were prepared excepting the composition of the binder.

Namely, the binders in these Examples were prepared by employing particles of copolymer consisting of a maleic acid unit and a vinyl alcohol unit alone in the ratios as shown in Table 2, or by employing a mixture of this copolymer particles and at least one kind of compound selected from carboxymethyl cellulose, methyl cellulose, hydroxypropylmethyl cellulose, polyvinyl alcohol and sodium polyacrylate in the ratios as shown in Table 2.

As for the copolymer particles, AQUA-RESERVE GP (a trade name; Nihon Gosei Kagaku Kogyo Co., Ltd.) was employed. This copolymer particles were found to have a cumulative 10% particle diameter D10 of 5 μm, and a cumulative 50% particle diameter D50 of 12 μm as measured by way of a laser diffraction scattering method. The water-absorbing ability of this copolymer particles was found to be 500 g/g. Further, when a 1 wt. % aqueous solution was prepared from the copolymer particles, the viscosity of the aqueous solution was found to be 1,500 cp.

A separator of the same type as used in Examples 1 to 15 was disposed between the negative electrode thus obtained and the positive electrode of the same structure as employed in Examples 1 to 15, and the resultant composite was spirally wound to form an electrode group. This electrode group was housed in a cylindrical case of AA size, and an electrolyte solution having the same composition as used in Examples 1 to 15 was poured into the cylindrical case. With the inlet port being sealed, a cylindrical alkaline secondary battery having a capacity of 1,000 mAh and constructed as shown in FIG. 1 was assembled.

Comparative Examples 1 to 4

A cylindrical alkaline secondary battery constructed in the same manner as in Examples 1 to 15 was prepared as shown in FIG. 1, excepting the composition of the binder.

Namely, the binders in these Comparative Examples were prepared by mixing sodium polyacrylate and at least one kind of compound selected from carboxymethyl cellulose, methyl cellulose, hydroxypropylmethyl cellulose and polyvinyl alcohol in the ratios as shown in Table 1.

The secondary batteries prepared according to Examples 1 to 30 and Comparative Examples 1 to 4 were subjected to an aging at a temperature of 45° C. for 24 hours, and then to the initial charging thereby conditioning the batteries.

These batteries of Examples 1 to 30 and Comparative Examples 1 to 4 conditioned through the initial charging were subjected to seven cycles of charge/discharge wherein each battery was charged to a depth of 150% with 1 C and then discharged with a cut of 1 C/1.0 V. Additionally, these batteries were subjected to ten cycles of charge/discharge wherein each battery was charged to a depth of 480% with 1 C and then discharged with a cut of 1 C/1.0 V. At this tenth cycle, the internal pressure, discharge capacity and battery voltage were measured, the results being illustrated in Tables 3 and 4 below.

In another test, the batteries of Examples 1 to 30 and Comparative Examples 1 to 4 conditioned through the initial charging were subjected to cycles of charge/discharge wherein each battery was charged to a depth of 150% with 1 C and then discharged with a cut of 1 C/1.0 V until the discharge capacity became lowered down to 800 mA or less, and the number of the cycles required for reaching to this value was measured, the results being shown in Tables 3 and 4.

Further, the pastes of negative electrodes of Examples 1 to 30 and Comparative Examples 1 to 4 were tested with respect to the dispersion and stability (evaluated by observing a change in external appearance after leaving a paste for a whole day and night), and to the adhesion (sticking an adhesive tape on a substrate coated on a paste, measuring the amount of paste which was peeled off by the tape). The dispersion, the stability and the adhesion were relatively evaluated in five categories, respectively. The results being illustrated in Tables 5 and 6 below.

In a further test, the negative electrodes of Examples 1 to 30 and Comparative Examples 1 to 4 were immersed into an ion-exchange water for 60 minutes, then the surfaces thereof were wiped off using a water-absorptive paper, and the weights of these negative electrodes were measured thus calculating the water absorption (the ratio of increase in weight as compared with the weight before the immersion), the results being shown in Tables 5 and 6. Further, the degree of swelling of these negative electrodes after the water absorption were relatively evaluated in five categories by observing the outer appearance of them, the results being illustrated in Tables 5 and 6 below.

In another test, the spiral winding of the negative electrodes of Examples 1 to 30 and Comparative Examples 1 to 4 were repeated five times, and then the weight of each negative electrode was measured to see how much the weights of these negative electrodes were decreased as compared with those before the spiral winding thereof, thereby evaluating the strength of each negative electrode, the results being shown in Tables 5 and 6.

TABLE 1

| | Mixing Ratio of Binder (wt. parts) | | | | | |
|---|---|---|---|---|---|---|
| | Acrylic Copolymer | CMC | MC | HPMC | PVA | SPA |
| Example 1 | 0.3 | 0 | 0 | 0 | 0 | 0 |
| Example 2 | 0.5 | 0 | 0 | 0 | 0 | 0 |
| Example 3 | 1.0 | 0 | 0 | 0 | 0 | 0 |
| Example 4 | 2.0 | 0 | 0 | 0 | 0 | 0 |
| Example 5 | 3.0 | 0 | 0 | 0 | 0 | 0 |
| Example 6 | 0.3 | 0 | 0.125 | 0 | 0 | 0 |
| Example 7 | 0.3 | 0 | 0 | 0 | 0.125 | 0 |
| Example 8 | 0.3 | 0.125 | 0 | 0 | 0.125 | 0 |
| Example 9 | 0.05 | 0.125 | 0 | 0 | 0 | 0 |
| Example 10 | 0.1 | 0.125 | 0 | 0 | 0 | 0 |
| Example 11 | 0.2 | 0.125 | 0 | 0 | 0 | 0 |
| Example 12 | 0.3 | 0.125 | 0 | 0 | 0 | 0 |
| Example 13 | 0.5 | 0.125 | 0 | 0 | 0 | 0 |
| Example 14 | 1.0 | 0.125 | 0 | 0 | 0 | 0 |
| Example 15 | 2.0 | 0.235 | 0 | 0 | 0 | 0 |
| Comparative Example 1 | 0 | 0.125 | 0 | 0 | 0 | 0.5 |
| Comparative Example 2 | 0 | 0 | 0.125 | 0 | 0 | 0.5 |
| Comparative Example 3 | 0 | 0 | 0 | 0.125 | 0 | 0.5 |
| Comparative Example 4 | 0 | 0 | 0 | 0 | 0.125 | 0.5 |

TABLE 2

| | Mixing Ratio of Binder (wt. parts) | | | | | |
|---|---|---|---|---|---|---|
| | Maleic Copolymer | CMC | MC | HPMC | PVA | SPA |
| Example 16 | 0.3 | 0 | 0 | 0 | 0 | 0 |
| Example 17 | 0.5 | 0 | 0 | 0 | 0 | 0 |
| Example 18 | 1.0 | 0 | 0 | 0 | 0 | 0 |
| Example 19 | 2.0 | 0 | 0 | 0 | 0 | 0 |
| Example 20 | 3.0 | 0 | 0 | 0 | 0 | 0 |
| Example 21 | 0.3 | 0 | 0.125 | 0 | 0 | 0 |
| Example 22 | 0.3 | 0 | 0 | 0 | 0.125 | 0 |
| Example 23 | 0.3 | 0.125 | 0 | 0 | 0.125 | 0 |
| Example 24 | 0.05 | 0.125 | 0 | 0 | 0 | 0 |
| Example 25 | 0.1 | 0.125 | 0 | 0 | 0 | 0 |
| Example 26 | 0.2 | 0.125 | 0 | 0 | 0 | 0 |
| Example 27 | 0.3 | 0.125 | 0 | 0 | 0 | 0 |
| Example 28 | 0.5 | 0.125 | 0 | 0 | 0 | 0 |
| Example 29 | 1.0 | 0.125 | 0 | 0 | 0 | 0 |
| Example 30 | 2.0 | 0.125 | 0 | 0 | 0 | 0 |

TABLE 3

| | Properties of Battery | | | |
|---|---|---|---|---|
| | Internal pressure (kg/cm$^2$) | Capacity (mAH) | Voltage (V) | Cycle Life (cycles) |
| Example 1 | 9.51 | 990 | 1.181 | 290 |
| Example 2 | 8.50 | 990 | 1.176 | 280 |
| Example 3 | 8.40 | 990 | 1.186 | 295 |
| Example 4 | 7.30 | 990 | 1.180 | 300 |
| Example 5 | 8.50 | 950 | 1.165 | 280 |
| Example 6 | 7.32 | 981 | 1.175 | 290 |
| Example 7 | 4.98 | 998 | 1.175 | 270 |
| Example 8 | 6.57 | 980 | 1.178 | 200 |
| Example 9 | 2.02 | 980 | 1.178 | 250 |
| Example 10 | 2.32 | 987 | 1.179 | 300 |
| Example 11 | 2.46 | 958 | 1.179 | 300 |
| Example 12 | 4.44 | 996 | 1.178 | 300 |
| Example 13 | 5.21 | 1006 | 1.180 | 250 |
| Example 14 | 7.35 | 986 | 1.179 | 200 |
| Example 15 | 9.50 | 991 | 1.179 | 200 |
| Comparative Example 1 | 18.0 | 961 | 1.170 | 190 |
| Comparative Example 2 | 15.31 | 979 | 1.169 | 160 |
| Comparative Example 3 | 15.45 | 971 | 1.168 | 160 |
| Comparative Example 4 | 15.52 | 929 | 1.168 | 160 |

TABLE 4

| | Properties of Battery | | | |
|---|---|---|---|---|
| | Internal pressure (kg/cm$^2$) | Capacity (mAH) | Voltage (V) | Cycle Life (cycles) |
| Example 16 | 9.50 | 990 | 1.181 | 280 |
| Example 17 | 8.60 | 985 | 1.177 | 280 |
| Example 18 | 8.50 | 960 | 1.186 | 300 |
| Example 19 | 7.65 | 960 | 1.180 | 300 |
| Example 20 | 8.70 | 950 | 1.165 | 280 |
| Example 21 | 7.50 | 988 | 1.176 | 300 |
| Example 22 | 5.34 | 999 | 1.176 | 270 |
| Example 23 | 6.21 | 979 | 1.178 | 200 |
| Example 24 | 1.98 | 981 | 1.179 | 250 |
| Example 25 | 2.52 | 990 | 1.180 | 300 |
| Example 26 | 2.90 | 960 | 1.180 | 300 |
| Example 27 | 4.73 | 990 | 1.179 | 300 |
| Example 28 | 4.99 | 1010 | 1.181 | 250 |
| Example 29 | 7.65 | 980 | 1.179 | 200 |
| Example 30 | 9.52 | 990 | 1.179 | 200 |
| Comparative Example 1 | 18.0 | 961 | 1.170 | 190 |
| Comparative Example 2 | 15.31 | 979 | 1.169 | 160 |
| Comparative Example 3 | 15.45 | 971 | 1.168 | 160 |
| Comparative Example 4 | 15.52 | 929 | 1.168 | 160 |

TABLE 5

| | Properties of Paste | | | Properties of Negative Electrode | | |
|---|---|---|---|---|---|---|
| | Dispersibility | Stability | Adhesion | Water Absorption (%) | Swelling Degree | Strength (%) |
| Example 1 | 4 | 3 | 4 | 7 | 4 | 1.3 |
| Example 2 | 4 | 4 | 4 | 17 | 4 | 1.5 |
| Example 3 | 4 | 3 | 4 | 14 | 4 | 1.5 |

TABLE 5-continued

| | Properties of Paste | | | Properties of Negative Electrode | | |
|---|---|---|---|---|---|---|
| | Dispersibility | Stability | Adhesion | Water Absorption (%) | Swelling Degree | Strength (%) |
| Example 4 | 4 | 3 | 4 | 15 | 3 | 2.9 |
| Example 5 | 3 | 2 | 4 | 16 | 3 | 3.9 |
| Example 6 | 4 | 4 | 5 | 20 | 4 | 0.9 |
| Example 7 | 5 | 5 | 4 | 12 | 5 | 0.8 |
| Example 8 | 4 | 5 | 5 | 15 | 4 | 1.6 |
| Example 9 | 4 | 4 | 4 | 9.5 | 4 | 7 |
| Example 10 | 4 | 4 | 5 | 10 | 4 | 6 |
| Example 11 | 5 | 5 | 5 | 11 | 5 | 3.5 |
| Example 12 | 5 | 5 | 5 | 13 | 5 | 0.4 |
| Example 13 | 5 | 5 | 5 | 25 | 5 | 0.5 |
| Example 14 | 4 | 4 | 5 | 60 | 4 | 0.4 |
| Example 15 | 4 | 4 | 5 | 130 | 4 | 0.5 |
| Comparative Example 1 | 4 | 4 | 4 | 17 | 1 | 9 |
| Comparative Example 2 | 2 | 2 | 2 | 10 | 4 | 3.8 |
| Comparative Example 3 | 2 | 2 | 2 | 6 | 4 | 3.3 |
| Comparative Example 4 | 2 | 2 | 2 | 10 | 4 | 48 |

TABLE 6

| | Properties of Paste | | | Properties of Negative Electrode | | |
|---|---|---|---|---|---|---|
| | Dispersibility | Stability | Adhesion | Water Absorption (%) | Swelling Degree | Strength (%) |
| Example 16 | 4 | 3 | 4 | 5 | 4 | 1.1 |
| Example 17 | 4 | 4 | 4 | 14 | 4 | 1.6 |
| Example 18 | 4 | 3 | 4 | 12 | 4 | 1.2 |
| Example 19 | 3 | 3 | 4 | 13 | 3 | 3.0 |
| Example 20 | 2 | 2 | 4 | 14 | 3 | 3.5 |
| Example 21 | 4 | 5 | 5 | 17 | 3 | 0.9 |
| Example 22 | 4 | 5 | 5 | 9 | 4 | 0.7 |
| Example 23 | 4 | 5 | 5 | 13 | 4 | 1.7 |
| Example 24 | 4 | 4 | 4 | 8 | 4 | 8 |
| Example 25 | 4 | 4 | 5 | 8 | 4 | 7 |
| Example 26 | 4 | 5 | 5 | 9 | 5 | 3.4 |
| Example 27 | 4 | 5 | 5 | 10 | 5 | 0.5 |
| Example 28 | 4 | 5 | 5 | 18 | 5 | 0.5 |
| Example 29 | 4 | 4 | 5 | 50 | 4 | 0.4 |
| Example 30 | 4 | 4 | 5 | 90 | 4 | 0.6 |
| Comparative Example 1 | 4 | 4 | 4 | 17 | 1 | 9 |
| Comparative Example 2 | 2 | 2 | 2 | 10 | 4 | 3.8 |
| Comparative Example 3 | 2 | 2 | 2 | 6 | 4 | 3.3 |
| Comparative Example 4 | 2 | 2 | 2 | 10 | 4 | 4.8 |

As seen from the Tables 3 and 4, the secondary batteries according to Examples of 1 to 30 are high in capacity and battery voltage, and capable of inhibiting the increase of internal pressure in the process of charging/discharging cycles, thus indicating a longer cycle life of charging/discharging as compared with those of the Comparative Examples 1 to 4. This can be attributed to the fact that the copolymers consisting of a vinyl alcohol unit and a unit having COOX group were employed as a binder in Examples of 1 to 30.

As seen from the Tables 5 and 6, the pastes according to Examples of 1 to 30 are excellent in dispersion stability and adhesion. Additionally, the negative electrodes produced from these pastes are high in water absorption and low in swelling after water absorption, and are capable of strongly retaining an active material on a conductive substrate. This can be attributed to the fact that the copolymer consisting of a vinyl alcohol unit and a unit having COOX group is high in water absorption, low in swelling after water absorption, high in capability of retaining an active material, and effective in improving the dispersion stability.

By contrast, the paste of Comparative Example 1 shows almost the same degree of dispersion stability and adhesion as those of Examples 1 to 30. However, the negative electrode prepared from the paste swells quite easily and the amount of the active material falling from the negative electrode is quite large. On the other hand, as seen from the Tables, the pastes of Comparative Examples 2 to 4 are poor in dispersion stability and low in adhesion. Accordingly, it can be seen that in order to realize an effective inhibition of increase in internal pressure in the process of charging/discharging cycles and a long cycle life, it is very important to employ a binder which is excellent in dispersion stability, high in adhesion and in water absorption, excellent in anti-swelling and high in retention of active material.

Examples 31 to 36

A cylindrical alkaline secondary battery constructed in the same manner as in Examples 1 to 15 was prepared as shown in FIG. 1, excepting the composition of the binder.

Namely, as a binder for negative electrode, copolymer particles consisting of a sodium acrylate unit and a vinyl alcohol unit, and having D10 and D50 as shown in Table 7 shown below were employed at ratio of 0.5 parts by weight.

As for the copolymer particles, SUMIKA-GEL SP-520 (a trade name; Sumitomo Kagaku Kogyo Co., Ltd.) was employed. The water-absorbing ability of this copolymer particles was found to be 500 g/g. Further, when a 1 wt. % aqueous solution was prepared from the copolymer particles, the viscosity of the aqueous solution was found to be 1,500 cp.

The secondary batteries prepared according to Examples 31 to 36 were subjected to an aging at a temperature of 45° C. for 24 hours, and then to the initial charging thereby conditioning the batteries.

These batteries of Examples 31 to 36 conditioned through the initial charging were subjected to seven cycles of charge/discharge wherein each battery was charged to a depth of 150% with 1 C and then discharged with a cut of 1 C/1.0 V. Additionally, these batteries were subjected to ten cycles of charge/discharge wherein each battery was charged to a depth of 480% with 1 C and then discharged with a cut of 1 C/1.0 V. At this tenth cycle, the internal pressure, discharge capacity and battery voltage were measured, the results being illustrated in Table 8 shown below.

In another test, the batteries of Examples 31 to 36 conditioned through the initial charging were subjected to cycles of charge/discharge wherein each battery was charged to a depth of 150% with 1 C and then discharged with a cut of 1 C/1.0 V until the discharge capacity became lowered down to 800 mA or less, and the number of the cycles required for reaching to this value was measured, the results being shown in Table 8.

Further, the pastes of negative electrodes of Examples 31 to 36 were tested with respect to the dispersion and stability and to adhesion. The dispersion, the stability and the adhesion were relatively evaluated in five categories, respectively. The results being illustrated in Table 9 shown below.

In a further test, the negative electrodes of Examples 31 to 36 were immersed into an ion-exchange water for 60 minutes, then the surfaces thereof were wiped off using a water-absorptive paper, and the weights of these negative electrodes were measured thus calculating the water absorption (the ratio of increase in weight as compared with the weight before the immersion), the results being shown in Table 9. Further, the degree of swelling of these negative electrodes after the water absorption were relatively evaluated in five categories by observing the outer appearance of them, the results being illustrated in Table 9 shown below.

In another test, the spiral winding of the negative electrodes of Examples 31 to 36 were repeated five times, and then the weight of each negative electrode was measured to see how much the weights of these negative electrodes were decreased as compared with those before the spiral winding thereof, thereby evaluating the strength of each negative electrode, the results being shown in Table 9.

TABLE 7

| | Copolymer of Sodium acrylate/ Vinyl Alcohol | |
|---|---|---|
| | D10 (μm) | D50 (μm) |
| Example 31 | 1.7 | 9.0 |
| Example 32 | 6.0 | 17 |
| Example 33 | 1.0 | 6.0 |
| Example 34 | 18 | 48 |
| Example 35 | 0.8 | 5.0 |
| Example 36 | 25 | 60 |

TABLE 8

| | Properties of Battery | | | |
|---|---|---|---|---|
| | Internal pressure (kg/cm$^2$) | Capacity (mAH) | Voltage (V) | Cycle Life (cycles) |
| Example 31 | 3.5 | 990 | 1.180 | 295 |
| Example 32 | 4.1 | 991 | 1.180 | 300 |
| Example 33 | 4.5 | 998 | 1.181 | 295 |
| Example 34 | 4.8 | 997 | 1.183 | 298 |
| Example 35 | 6.1 | 990 | 1.180 | 280 |
| Example 36 | 5.2 | 990 | 1.181 | 280 |

TABLE 9

| | Properties of Paste | | | Properties of Negative Electrode | | |
|---|---|---|---|---|---|---|
| | Dispersibility | Stability | Adhesion | Water Absorption (%) | Swelling Degree | Strength (%) |
| Example 31 | 5 | 5 | 5 | 6 | 5 | 1.0 |
| Example 32 | 5 | 5 | 5 | 7 | 5 | 0.8 |
| Example 33 | 4 | 4 | 5 | 8 | 5 | 0.9 |
| Example 34 | 4 | 4 | 5 | 8 | 5 | 1.0 |
| Example 35 | 3 | 3 | 4 | 7 | 5 | 1.2 |
| Example 36 | 2 | 2 | 4 | 10 | 3 | 1.3 |

As seen from the Table 8, the secondary batteries according to Examples of 31 to 36 are capable of inhibiting an increase of internal pressure in the process of charging/discharging cycles, and at the same time are high in capacity and battery voltage, thus indicating a longer cycle life of charging/discharging. In particular, the secondary batteries of Examples 31 to 34 are longer in life of charging/discharging cycles, and lower in internal pressure as compared with Examples 35 and 36.

As seen from the Table 9, the negative electrodes of Examples 31 to 36 are high in water absorption, highly resistive to the swelling after water absorption and high in strength. The pastes of Examples 31 to 34 are more excellent in dispersion stability and adhesion as compared with Examples 35 and 36. This can be attributed to the fact that Examples 31 to 34 employ, as a binder for negative electrode, the copolymer consisting of a sodium acrylate unit and a vinyl alcohol unit, and having a cumulative 10% particle diameter D10 falling in the range of 1 to 20 μm and a cumulative 50% particle diameter D50 falling in the range of 5 to 50 μm and meeting the condition of D10<D50.

Examples 37 to 43

A cylindrical alkaline secondary battery constructed in the same manner as in Examples 1 to 15 was prepared as shown in FIG. 1, excepting the composition of the binder.

Namely, as a binder for negative electrode, copolymer particles consisting of a maleic acid unit and a vinyl alcohol unit, and having D10 and D50 as shown in Table 10 shown below were employed at ratio of 0.5 parts by weight.

As for the copolymer particles, AQUA-RESERVE GP (a trade name; Nihon Gosei Kagaku Kogyo Co., Ltd.) was employed. The water-absorbing ability of this copolymer particles was found to be 500 g/g. Further, when a 1 wt. % aqueous solution was prepared from the copolymer particles, the viscosity of the aqueous solution was found to be 1,500 cp.

The secondary batteries prepared according to Examples 37 to 43 were subjected to an aging at a temperature of 45° C. for 24 hours, and then to the initial charging thereby conditioning the batteries.

These batteries of Examples 37 to 43 conditioned through the initial charging were subjected to the same cycling test as conducted in Examples 31 to 36, and at the tenth cycle, the internal pressure, discharge capacity and battery voltage were measured, the results being illustrated in Table 11 shown below.

In another test, the batteries of Examples 37 to 43 conditioned through the initial charging were subjected to the same cycling test as conducted in Examples 31 to 36, and the number of the cycles required for reaching to a capacity of 800 mA or less was measured, the results being shown in Table 11.

Further, the pastes of negative electrodes of Examples 37 to 43 were tested with respect to the dispersion and stability and to the adhesion. The dispersion, the stability and the adhesion were relatively evaluated in five categories, respectively. The results being illustrated in Table 12 shown below.

In a further test, the negative electrodes of Examples 37 to 43 were subjected to the same water-absorption test as conducted in Examples 31 to 36, and the water absorptions thereof were measured, the results being shown in Table 12. Further, the degree of swelling of these negative electrodes after the water absorption were relatively evaluated in five categories by observing the outer appearance of them, the results being illustrated in Table 12 shown below.

In another test, the negative electrodes of Examples 37 to 43 were subjected to the same strength test as conducted in Examples 31 to 36, the results measured of strength of each negative electrode are shown in Table 12.

TABLE 10

|  | Copolymer of Maleic Acid/ Vinyl Alcohol | |
| --- | --- | --- |
|  | D10 (μm) | D50 (μm) |
| Example 37 | 1.6 | 8.9 |
| Example 38 | 5.8 | 16.5 |
| Example 39 | 1.2 | 6.2 |
| Example 40 | 18 | 48 |
| Example 41 | 1.5 | 40 |
| Example 42 | 0.7 | 6.0 |
| Example 43 | 27 | 63 |

TABLE 11

|  | Properties of Battery | | | |
| --- | --- | --- | --- | --- |
|  | Internal pressure (kg/cm$^2$) | Capacity (mAH) | Voltage (V) | Cycle Life (cycles) |
| Example 37 | 3.7 | 996 | 1.182 | 302 |
| Example 38 | 4.3 | 991 | 1.181 | 297 |
| Example 39 | 4.7 | 995 | 1.181 | 298 |
| Example 40 | 4.8 | 995 | 1.181 | 299 |
| Example 41 | 5.0 | 997 | 1.180 | 300 |
| Example 42 | 6.0 | 990 | 1.181 | 280 |
| Example 43 | 5.0 | 992 | 1.182 | 282 |

TABLE 12

|  | Properties of Paste | | | Properties of Negative Electrode | | |
| --- | --- | --- | --- | --- | --- | --- |
|  | Dispersibility | Stability | Adhesion | Water Absorption (%) | Swelling Degree | Strength (%) |
| Example 37 | 5 | 5 | 5 | 7 | 5 | 1.0 |
| Example 38 | 5 | 5 | 5 | 6 | 5 | 0.9 |
| Example 39 | 4 | 4 | 5 | 8 | 5 | 0.7 |
| Example 40 | 4 | 4 | 5 | 8 | 5 | 0.8 |
| Example 41 | 4 | 4 | 5 | 9 | 5 | 1.0 |
| Example 42 | 3 | 3 | 4 | 7 | 5 | 1.2 |
| Example 43 | 2 | 2 | 4 | 12 | 3 | 1.4 |

As seen from the Table 11, the secondary batteries according to Examples of 37 to 43 are capable of inhibiting an increase of internal pressure in the process of charging/discharging cycles, and at the same time are high in capacity and battery voltage, thus indicating a longer cycle life of charging/discharging. In particular, the secondary batteries of Examples 37 to 41 are longer in life of charging/discharging cycles.

As seen from the Table 12, the negative electrodes of Examples 37 to 43 are high in water absorption, highly resistive to the swelling after water absorption and high in strength. The pastes of Examples 37 to 41 are more excellent in dispersion stability and adhesion as compared with Examples 42 and 43. This can be attributed to the fact that Examples 37 to 41 employ, as a binder for negative electrode, the copolymer consisting of a maleic acid unit and a vinyl alcohol unit, and having a cumulative 10% particle diameter D10 falling in the range of 1 to 20 μm and a cumulative 50% particle diameter D50 falling in the range of 5 to 50 μm and meeting the condition of D10<D50.

(2) an alkaline secondary battery provided with a positive electrode comprising as a binder a copolymer consisting of a vinyl alcohol unit and a unit having COOX group

EXAMPLES 50 TO 63

(Preparation of a paste-type positive electrode)

To a mixture comprising 90 parts by weight of nickel hydroxide powder and 10 parts by weight of cobalt monoxide were added a binder and 60 parts by weight of demineralized water, and the resultant mixture was kneaded to prepare a paste. This paste was then filled into a conductive substrate formed of a metallic porous body consisting of nickel-plated fibers and then the same paste was coated over the both surfaces of the substrate. After being dried, the substrate was roll-pressed to obtain a paste-type positive electrode having a thickness of 0.6 mm and a capacity per unit volume of 670 mAH/cc.

As for the binder, particles of copolymer consisting of a sodium acrylate unit and a vinyl alcohol unit were employed alone in the ratios as shown in Table 13, or a mixture of this copolymer particles and at least one kind of compound selected from polytetrafluoroethylene (PTFE), polyvinyl alcohol (PVA), carboxymethyl cellulose (CMC), methyl cellulose (MC) and sodium polyacrylate (SPA) was employed in the ratios as shown in Table 13.

As for the copolymer particles, SUMIKA-GEL SP-520 (a trade name; Sumitomo Kagaku Kogyo Co., Ltd.) was employed. This copolymer particles were found to have a cumulative 10% particle diameter D10 of 5 μm and a cumulative 50% particle diameter D50 of 12 μm as measured by way of a laser diffraction scattering method. The water-absorbing ability of this copolymer particles was found to be 500 g/g. Further, when a 1 wt. % aqueous solution was prepared from the copolymer particles, the viscosity of the aqueous solution was found to be 1,500 cp.

(Preparation of a paste-type negative electrode)

To 100 parts by weight of the hydrogen-absorbing alloy powder prepared as shown in Examples 1 to 15 were mixed and kneaded with 0.5 part by weight of sodium polyacrylate, 0.125 part by weight of carboxymethyl cellulose, 1.0 part by weight (calculated as solid content) of the dispersion of polytetrafluoroethylene (specific gravity: 1.5, solid content: 60 wt. %), 1.0 part by weight of carbon black and 50 parts by weight of water thereby preparing a paste. This paste was coated over a perforated metal, and after being dried, press-molded to form a hydrogen-absorbing alloy negative electrode.

A separator of the same type as used in Examples 1 to 15 was disposed between the negative electrode and the positive electrode, and the resultant composite was spirally wound to form an electrode group. This electrode group was housed in a cylindrical case of AA size, and an electrolyte of the same composition as used in Examples 1 to 15 was poured into the cylindrical case. After sealing the inlet port, a cylindrical alkaline secondary battery having a capacity of 1,000 mAh and constructed as shown in FIG. 1 was assembled.

EXAMPLES 64 to 76

Positive electrodes constructed in the same manner as in Examples 50 to 63 were prepared excepting the composition of the binder.

Namely, the binders in these Examples were prepared by employing particles of copolymer consisting of a maleic acid unit and a vinyl alcohol unit alone in the ratios as shown in Table 14, or by employing a mixture of this copolymer particles and at least one kind of compound selected from polytetrafluoroethylene, sodium polyacrylate, carboxymethyl cellulose, methyl cellulose and polyvinyl alcohol in the ratios as shown in Table 14.

As for the copolymer particles, AQUA RESERVE GP (a trade name; Nihon Gosei Kagaku Kogyo Co., Ltd.) was employed. This copolymer particles were found to have a cumulative 10% particle diameter D10 of 5 μm and a cumulative 50% particle diameter D50 of 12 μm as measured by way of a laser diffraction scattering method. The water-absorbing ability of this copolymer particles was found to be 500 g/g. Further, when a 1 wt. % aqueous solution was prepared from the copolymer particles, the viscosity of the aqueous solution was found to be 1,500 cp.

A separator of the same type as used in Examples 1 to 15 was disposed between the positive electrode thus obtained and the negative electrode of the same structure as employed in Examples 50 to 63, and the resultant composite was spirally wound to form an electrode group. This electrode group was housed in a cylindrical case of AA size, and an electrolyte having the same composition as used in Examples 1 to 15 was poured into the cylindrical case. After sealing the inlet port, a cylindrical alkaline secondary battery having a capacity of 1,000 mAh and constructed as shown in FIG. 1 was assembled.

Comparative Examples 11 to 15

A cylindrical alkaline secondary battery constructed in the same manner as in Examples 50 to 63 was prepared as shown in FIG. 1, excepting the composition of the binder.

Namely, the binders in these Comparative Examples were prepared from at least one compound selected from sodium polyacrylate (LEODIC, a trade name of the product of Nihon Junyaku Co. Ltd.), polytetrafluoroethylene, carboxymethyl cellulose, methyl cellulose and polyvinyl alcohol in the ratios as shown in Table 13.

The secondary batteries prepared according to Examples 50 to 76 and Comparative Examples 11 to 15 were subjected to an aging at a temperature of 45° C. for 24 hours, and then to the initial charging thereby conditioning the batteries.

These batteries of Examples 50 to 76 and Comparative Examples 11 to 15 conditioned through the initial charging were subjected to seven cycles of charge/discharge wherein each battery was charged to a depth of 150% with 1 C and then discharged with a cut of 1 C/1.0 V. Additionally, these batteries were subjected to ten cycles of charge/discharge wherein each battery was charged to a depth of 480% with 1 C and then discharged with a cut of 1 C/1.0 V. At this tenth cycle, the internal pressure, discharge capacity and battery voltage were measured, the results being illustrated in Tables 15 and 16 shown below.

In another test, the batteries of Examples 50 to 76 and Comparative Examples 11 to 15 conditioned through the initial charging were subjected to cycles of charge/discharge wherein each battery was charged to a depth of 150% with 1 C and then discharged with a cut of 1 C/1.0 V until the discharge capacity became lowered down to 800 mA or less, and the number of the cycles required for reaching to this value was measured, the results being shown in Tables 15 and 16.

Further, the pastes of positive electrodes of Examples 50 to 76 and Comparative Examples 11 to 15 were tested with respect to the dispersion, stability and the adhesion. The dispersion, the stability and the adhesion were relatively evaluated in five categories, respectively. The results being illustrated in Tables 17 and 18 shown below.

In a further test, the positive electrodes of Examples 50 to 76 and Comparative Examples 11 to 15 were immersed into an ion-exchange water for 60 minutes, then the surfaces thereof were wiped off using a water-absorptive paper, and the weights of these positive electrodes were measured thus calculating the water absorption (the ratio of increase in weight as compared with the weight before the immersion), the results being shown in Tables 17 and 18. Further, the degree of swelling of these positive electrodes after the water absorption were relatively evaluated in five categories by observing the outer appearance of them, the results being illustrated in Tables 17 and 18 shown below.

In another test, the spiral winding of the positive electrodes of Examples 50 to 76 and Comparative Examples 11 to 15 were repeated five times, and then the weight of each positive electrode was measured to see how much the weights of these positive electrodes were decreased as compared with those before the spiral winding thereof, thereby evaluating the strength of each positive electrode, the results being shown in Tables 17 and 18.

TABLE 13

| | Mixing Ratio of Binder (wt. parts) | | | | | |
|---|---|---|---|---|---|---|
| | Acrylic Copolymer | PTFE | SPA | CMC | MC | PVA |
| Example 50 | 0.1 | 0 | 0 | 0 | 0 | 0 |
| Example 51 | 0.2 | 0 | 0 | 0 | 0 | 0 |
| Example 52 | 3.0 | 0 | 0 | 0 | 0 | 0 |
| Example 53 | 10 | 0 | 0 | 0 | 0 | 0 |
| Example 54 | 20 | 0 | 0 | 0 | 0 | 0 |
| Example 55 | 0.02 | 2.5 | 0 | 0.5 | 0 | 0 |
| Example 56 | 0.05 | 2.5 | 0 | 0.5 | 0 | 0 |
| Example 57 | 0.2 | 2.5 | 0 | 0.5 | 0 | 0 |
| Example 58 | 0.5 | 2.5 | 0 | 0.5 | 0 | 0 |
| Example 59 | 5.0 | 2.5 | 0 | 0.5 | 0 | 0 |
| Example 60 | 10 | 2.5 | 0 | 0.5 | 0 | 0 |
| Example 61 | 0.5 | 2.5 | 0 | 0 | 0.5 | 0 |
| Example 62 | 0.2 | 2.5 | 0 | 0 | 0 | 0.5 |
| Example 63 | 0.5 | 2.5 | 0 | 0 | 0 | 0.5 |
| Comparative Example 11 | 0 | 2.5 | 0.5 | 0.5 | 0 | 0 |
| Comparative Example 12 | 0 | 2.5 | 0.5 | 0 | 0.5 | 0 |
| Comparative Example 13 | 0 | 2.5 | 0 | 0 | 0 | 0.5 |
| Comparative Example 14 | 0 | 2.5 | 0.2 | 0.5 | 0 | 0 |
| Comparative Example 15 | 0 | 0 | 0.5 | 0 | 0 | 0 |

TABLE 14

Mixing Ratio of Binder (wt. parts)

| | Maleic Copolymer | PTFE | SPA | CMC | MC | PVA |
|---|---|---|---|---|---|---|
| Example 64 | 0.1 | 0 | 0 | 0 | 0 | 0 |
| Example 65 | 0.2 | 0 | 0 | 0 | 0 | 0 |
| Example 66 | 0.5 | 0 | 0 | 0 | 0 | 0 |
| Example 67 | 10 | 0 | 0 | 0 | 0 | 0 |
| Example 68 | 20 | 0 | 0 | 0 | 0 | 0 |
| Example 69 | 0.02 | 2.5 | 0 | 0.5 | 0 | 0 |
| Example 70 | 0.05 | 2.5 | 0 | 0.5 | 0 | 0 |
| Example 71 | 0.5 | 2.5 | 0 | 0.5 | 0 | 0 |
| Example 72 | 5.0 | 2.5 | 0 | 0.5 | 0 | 0 |
| Example 73 | 10 | 2.5 | 0 | 0.5 | 0 | 0 |
| Example 74 | 0.5 | 2.5 | 0 | 0 | 0.5 | 0 |
| Example 75 | 0.2 | 2.5 | 0 | 0 | 0 | 0.5 |
| Example 76 | 0.5 | 2.5 | 0 | 0 | 0 | 0.5 |

TABLE 15

Properties of Battery

| | Internal pressure (kg/cm$^2$) | Capacity (mAH) | Voltage (V) | Cycle Life (cycles) |
|---|---|---|---|---|
| Example 50 | 3.2 | 1015 | 1.211 | 290 |
| Example 51 | 4.1 | 1020 | 1.214 | 300 |
| Example 52 | 6.8 | 1020 | 1.221 | 300 |
| Example 53 | 8.9 | 1030 | 1.210 | 310 |
| Example 54 | 10 | 1050 | 1.210 | 280 |
| Example 55 | 2.0 | 1100 | 1.209 | 290 |
| Example 56 | 2.1 | 1091 | 1.208 | 320 |
| Example 57 | 2.3 | 1090 | 1.208 | 330 |
| Example 58 | 3.6 | 1100 | 1.206 | 340 |
| Example 59 | 4.3 | 1099 | 1.201 | 330 |
| Example 60 | 6.7 | 1050 | 1.201 | 300 |
| Example 61 | 4.4 | 1040 | 1.218 | 320 |
| Example 62 | 2.2 | 1030 | 1.213 | 320 |
| Example 63 | 4.0 | 1070 | 1.222 | 310 |
| Comparative Example 11 | 12.2 | 990 | 1.176 | 190 |
| Comparative Example 12 | 18.8 | 970 | 1.186 | 180 |
| Comparative Example 13 | 14.3 | 960 | 1.176 | 175 |
| Comparative Example 14 | >20.0 | 960 | 1.192 | 180 |
| Comparative Example 15 | 12.0 | 970 | 1.170 | 150 |

TABLE 16

Properties of Battery

| | Internal pressure (kg/cm$^2$) | Capacity (mAH) | Voltage (V) | Cycle Life (cycles) |
|---|---|---|---|---|
| Example 64 | 3.5 | 1020 | 1.213 | 290 |
| Example 65 | 4.3 | 1015 | 1.210 | 300 |
| Example 66 | 8.0 | 1000 | 1.211 | 300 |
| Example 67 | 8.7 | 1002 | 1.210 | 310 |
| Example 68 | 10.5 | 1030 | 1.200 | 290 |
| Example 69 | 2.0 | 1050 | 1.208 | 310 |
| Example 70 | 2.1 | 1100 | 1.205 | 320 |
| Example 71 | 3.3 | 1098 | 1.216 | 330 |
| Example 72 | 4.0 | 1090 | 1.213 | 340 |
| Example 73 | 7.0 | 1055 | 1.215 | 320 |
| Example 74 | 4.3 | 1060 | 1.210 | 320 |
| Example 75 | 3.9 | 1070 | 1.210 | 310 |
| Example 76 | 3.4 | 1090 | 1.210 | 300 |
| Comparative Example 11 | 12.2 | 990 | 1.176 | 190 |
| Comparative Example 12 | 18.8 | 970 | 1.186 | 180 |
| Comparative Example 13 | 14.3 | 960 | 1.176 | 175 |
| Comparative Example 14 | >20.0 | 960 | 1.192 | 180 |
| Comparative Example 15 | 12.0 | 970 | 1.170 | 150 |

TABLE 17

| | Properties of Paste | | | Properties of Positive Electrode | | |
|---|---|---|---|---|---|---|
| | Dispersibility | Stability | Adhesion | Water Absorption (%) | Swelling Degree | Strength (%) |
| Example 50 | 5 | 5 | 5 | 7 | 5 | 2.0 |
| Example 51 | 5 | 5 | 5 | 15 | 5 | 0.9 |
| Example 52 | 5 | 5 | 5 | 22 | 5 | 0.4 |
| Example 53 | 5 | 5 | 5 | 27 | 5 | 0.3 |
| Example 54 | 5 | 5 | 5 | 30 | 5 | 1.2 |
| Example 55 | 5 | 5 | 5 | 6 | 5 | 1.9 |
| Example 56 | 5 | 5 | 5 | 9 | 5 | 1.6 |
| Example 57 | 5 | 5 | 5 | 11 | 5 | 1.4 |
| Example 58 | 5 | 5 | 5 | 18 | 5 | 1.0 |
| Example 59 | 5 | 5 | 5 | 20 | 5 | 1.5 |
| Example 60 | 5 | 5 | 5 | 25 | 5 | 2.0 |
| Example 61 | 5 | 5 | 5 | 20 | 5 | 0.9 |
| Example 62 | 5 | 5 | 5 | 9 | 5 | 1.3 |
| Example 63 | 5 | 5 | 5 | 18 | 5 | 0.7 |
| Comparative Example 11 | 5 | 5 | 4 | 32 | 3 | 9.4 |
| Comparative Example 12 | 2 | 2 | 3 | 34 | 2 | 8.8 |
| Comparative Example 13 | 1 | 1 | 2 | 14 | 2 | 11.6 |
| Comparative Example 14 | 5 | 5 | 4 | 20 | 2 | 9.1 |
| Comparative Example 15 | 3 | 3 | 3 | 15 | 2 | 3.8 |

TABLE 18

| | Properties of Paste | | | Properties of Positive Electrode | | |
|---|---|---|---|---|---|---|
| | Dispersibility | Stability | Adhesion | Water Absorption (%) | Swelling Degree | Strength (%) |
| Example 64 | 5 | 5 | 5 | 7 | 5 | 2.0 |
| Example 65 | 5 | 5 | 5 | 16 | 5 | 0.8 |
| Example 66 | 5 | 5 | 5 | 13 | 5 | 1.1 |
| Example 67 | 5 | 5 | 5 | 25 | 5 | 0.3 |
| Example 68 | 5 | 5 | 5 | 32 | 5 | 1.3 |
| Example 69 | 5 | 5 | 5 | 8 | 5 | 1.8 |
| Example 70 | 5 | 5 | 5 | 9 | 5 | 1.5 |
| Example 71 | 5 | 5 | 5 | 18 | 5 | 0.9 |
| Example 72 | 5 | 5 | 5 | 21 | 5 | 1.5 |
| Example 73 | 5 | 5 | 5 | 23 | 5 | 1.9 |

TABLE 18-continued

|  | Properties of Paste | | | Properties of Positive Electrode | | |
| --- | --- | --- | --- | --- | --- | --- |
|  | Dispersibility | Stability | Adhesion | Water Absorption (%) | Swelling Degree | Strength (%) |
| Example 74 | 5 | 5 | 5 | 20 | 5 | 0.9 |
| Example 75 | 5 | 5 | 5 | 10 | 5 | 1.2 |
| Example 76 | 5 | 5 | 5 | 16 | 5 | 0.7 |
| Comparative Example 11 | 5 | 5 | 4 | 32 | 3 | 9.4 |
| Comparative Example 12 | 2 | 2 | 3 | 34 | 2 | 8.8 |
| Comparative Example 13 | 1 | 1 | 2 | 14 | 2 | 11.6 |
| Comparative Example 14 | 5 | 5 | 4 | 20 | 2 | 9.1 |
| Comparative Example 15 | 3 | 3 | 3 | 15 | 2 | 3.8 |

As seen from the Tables 15 and 16, the secondary batteries according to Examples of 50 to 76 are high in capacity and battery voltage, lower in internal pressure and longer in cycle life of charging/discharging as compared with those of Comparative Examples 11 to 15. This can be attributed to the fact that the copolymers consisting of a vinyl alcohol unit and a unit having COOX group were employed as a binder for the positive electrodes in Examples of 50 to 76. As seen from the Tables 17 and 18, the pastes according to Examples of 50 to 76 are excellent in dispersion stability and adhesion. Additionally, the positive electrodes produced from these pastes are high in water absorption and low in swelling after water absorption, and are capable of strongly retaining an active material on a conductive substrate.

By contrast, the pastes of Comparative Examples 11 and 14 show almost the same degree of dispersion stability and adhesion as those of Examples 50 to 76. However, the positive electrode prepared from the paste swells quite easily and the amount of the active material falling off the positive electrode is quite large. On the other hand, as seen from the Tables, the pastes of Comparative Examples 12, 13 and 15 are poor in dispersion stability and low in adhesion. It can be seen that a positive electrode prepared from these pastes swells quite easily. Accordingly, it can be seen that in order to realize an effective inhibition of increase in internal pressure in the process of charging/discharging cycles and a long cycle life, it is very important to employ a binder which is excellent in dispersion stability, high in adhesion and in water absorption, excellent in anti-swelling and high in retention of active material.

EXAMPLES 77 to 82

A cylindrical alkaline secondary battery constructed in the same manner as in Examples 50 to 63 was prepared as shown in FIG. 1, excepting the composition of the binder.

Namely, as a binder for positive electrode, a copolymer particles consisting of a sodium acrylate unit and a vinyl alcohol unit, and having D10 and D50 as shown in Table 19 shown below were employed at ratio of 0.5 parts by weight.

As for the copolymer particles, SUMIKA-GEL SP-520 (a trade name; Sumitomo Kagaku Kogyo Co., Ltd.) was employed. The water-absorbing ability of this copolymer particles was found to be 500 g/g. Further, when a 1 wt. % aqueous solution was prepared from the copolymer particles, the viscosity of the aqueous solution was found to be 1,500 cp.

The secondary batteries prepared according to Examples 77 to 82 were subjected to an aging at a temperature of 45° C. for 24 hours, and then to the initial charging thereby conditioning the batteries.

These batteries of Examples 77 to 82 conditioned through the initial charging were subjected to seven cycles of charge/discharge wherein each battery was charged to a depth of 150% with 1 C and then discharged with a cut of 1 C/1.0 V. Additionally, these batteries were subjected to ten cycles of charge/discharge wherein each battery was charged to a depth of 480% with 1 C and then discharged with a cut of 1 C/1.0 V. At this tenth cycle, the internal pressure, discharge capacity and battery voltage were measured, the results being illustrated in Table 20 shown below.

In another test, the batteries of Examples 77 to 82 conditioned through the initial charging were subjected to cycles of charge/discharge wherein each battery was charged to a depth of 150% with 1 C and then discharged with a cut of 1 C/1.0 V until the discharge capacity became lowered down to 800 mA or less, and the number of the cycles required for reaching to this value was measured, the results being shown in Table 20.

Further, the pastes of positive electrodes of Examples 77 to 82 were tested with respect to the dispersion, the stability and the adhesion. The dispersion, the stability and the adhesion were relatively evaluated in five categories, respectively. The results being illustrated in Table 21 shown below.

In a further test, the positive electrodes of Examples 77 to 82 were immersed into an ion-exchange water for 60 minutes, then the surfaces thereof were wiped off using a water-absorptive paper, and the weights of these positive electrodes were measured thus calculating the water absorption (the ratio of increase in weight as compared with the weight before the immersion), the results being shown in Table 21. Further, the degree of swelling of these positive electrodes after the water absorption were relatively evaluated in five categories by observing the outer appearance of them, the results being illustrated in Table 21 shown below.

In another test, the spiral winding of the positive electrodes of Examples 77 to 82 were repeated five times, and then the weight of each positive electrode was measured to see how much the weights of these positive electrodes were decreased as compared with those before the spiral winding thereof, thereby evaluating the strength of each positive electrode, the results being shown in Table 21.

TABLE 19

|  | Copolymer of Sodium Acrylate/ Vinyl Alcohol | |
| --- | --- | --- |
|  | D10 (μm) | D50 (μm) |
| Example 77 | 1.7 | 9.0 |
| Example 78 | 6.0 | 17 |
| Example 79 | 1.0 | 6.0 |
| Example 80 | 18 | 48 |
| Example 81 | 0.8 | 5.0 |
| Example 82 | 25 | 60 |

TABLE 20

| | Properties of Battery | | | |
|---|---|---|---|---|
| | Internal pressure (kg/cm²) | Capacity (mAH) | Voltage (V) | Cycle Life (cycles) |
| Example 77 | 5.0 | 990 | 1.180 | 298 |
| Example 78 | 4.9 | 1000 | 1.190 | 300 |
| Example 79 | 4.3 | 1020 | 1.200 | 300 |
| Example 80 | 4.9 | 999 | 1.177 | 300 |
| Example 81 | 13.0 | 970 | 1.160 | 260 |
| Example 82 | 12.5 | 930 | 1.150 | 280 |

TABLE 21

| | Properties of Paste | | | Properties of Positive Electrode | | |
|---|---|---|---|---|---|---|
| | Dispersibility | Stability | Adhesion | Water Absorption (%) | Swelling Degree | Strength (%) |
| Example 77 | 5 | 5 | 5 | 10.5 | 5 | 1.5 |
| Example 78 | 5 | 5 | 5 | 10.9 | 5 | 1.9 |
| Example 79 | 4 | 4 | 5 | 11.0 | 5 | 1.4 |
| Example 80 | 5 | 5 | 5 | 9.7 | 5 | 1.3 |
| Example 81 | 3 | 3 | 4 | 9.8 | 3 | 3.5 |
| Example 82 | 3 | 2 | 4 | 9.4 | 4 | 4.8 |

As seen from the Table 20, the secondary batteries according to Examples of 77 to 82 are capable of inhibiting an increase of internal pressure in the process of charging/discharging cycles, and at the same time capable of realizing a high capacity, a high battery voltage and a longer cycle life of charging/discharging. In particular, the secondary batteries of Examples 77 to 80 are longer in life of charging/discharging cycles, and lower in internal pressure as compared with Examples 81 and 82.

As seen from the Table 21, the positive electrodes of Examples 77 to 82 are high in water absorption, highly resistive to the swelling after water absorption and high in strength. The pastes of Examples 77 to 80 are more excellent in dispersion stability and adhesion as compared with Examples 81 and 82. This can be attributed to the fact that Examples 77 to 80 employ, as a binder for positive electrode, the copolymer consisting of a sodium acrylate unit and a vinyl alcohol unit, and having a cumulative 10% particle diameter D10 falling in the range of 1 to 20 µm and a cumulative 50% particle diameter D50 falling in the range of 5 to 50 µm and meeting the condition of D10<D50.

EXAMPLES 83 to 88

A cylindrical alkaline secondary battery constructed in the same manner as in Examples 50 to 63 was prepared as shown in FIG. 1, excepting the composition of the binder.

Namely, as a binder for positive electrode, a copolymer particles consisting of a maleic acid unit and a vinyl alcohol unit, and having D10 and D50 as shown in Table 22 shown below were employed at ratio of 0.5 parts by weight.

As for the copolymer particles, AQUA-RESERVE GP (a trade name; Nihon Gosei Kagaku Kogyo Co., Ltd.) was employed. The water-absorbing ability of this copolymer particles was found to be 500 g/g. Further, when a 1 wt. % aqueous solution was prepared from the copolymer particles, the viscosity of the aqueous solution was found to be 1,500 cp.

The secondary batteries prepared according to Examples 83 to 88 were subjected to an aging at a temperature of 45° C. for 24 hours, and then to the initial charging thereby conditioning the batteries.

These batteries of Examples 83 to 88 conditioned through the initial charging were subjected to the same cycling test as conducted in Examples 77 to 82, and at the tenth cycle, the internal pressure, discharge capacity and battery voltage were measured, the results being illustrated in Table 23 shown below.

In another test, the batteries of Examples 83 to 88 conditioned through the initial charging were subjected to the same cycling test as conducted in Examples 77 to 82, and the number of the cycles required for reaching to a capacity of 800 mA or less was measured, the results being shown in Table 23.

Further, the pastes of positive electrodes of Examples 83 to 88 were tested with respect to the dispersion, stability and the adhesion. The dispersion, the stability and the adhesion were relatively evaluated in five categories, respectively. The results being illustrated in Table 24 shown below.

In a further test, the positive electrodes of Examples 83 to 88 were subjected to the same water-absorption test as conducted in Examples 77 to 82, and the water absorptions thereof were measured, the results being shown in Table 24. Further, the degree of swelling of these positive electrodes after the water absorption were relatively evaluated in five categories by observing the outer appearance of them, the results being illustrated in Table 24 shown below.

In another test, the positive electrodes of Examples 83 to 88 were subjected to the same strength test as conducted in Examples 77 to 82, the results measured of strength of each positive electrode are shown in Table 24.

TABLE 22

| | Copolymer of Maleic Acid/ Vinyl Alcohol | |
|---|---|---|
| | D10 (µm) | D50 (µm) |
| Example 83 | 1.6 | 8.9 |
| Example 84 | 5.8 | 16.5 |
| Example 85 | 1.2 | 6.2 |
| Example 86 | 18 | 48 |
| Example 87 | 0.7 | 6.0 |
| Example 88 | 27 | 63 |

TABLE 23

| | Properties of Battery | | | |
|---|---|---|---|---|
| | Internal pressure (kg/cm²) | Capacity (mAH) | Voltage (V) | Cycle Life (cycles) |
| Example 83 | 4.9 | 992 | 1.178 | 290 |
| Example 84 | 4.3 | 1050 | 1.200 | 300 |
| Example 85 | 4.8 | 1030 | 1.198 | 320 |
| Example 86 | 5.0 | 1000 | 1.180 | 300 |
| Example 87 | 10.9 | 990 | 1.188 | 280 |
| Example 88 | 11.0 | 997 | 1.189 | 280 |

TABLE 24

| | Properties of Paste | | | Properties of Positive Electrode | | |
|---|---|---|---|---|---|---|
| | Dispersibility | Stability | Adhesion | Water Absorption (%) | Swelling Degree | Strength (%) |
| Example 83 | 5 | 5 | 5 | 10.2 | 5 | 1.0 |
| Example 84 | 5 | 5 | 5 | 10.5 | 5 | 0.9 |
| Example 85 | 5 | 4 | 5 | 11.0 | 5 | 0.8 |
| Example 86 | 5 | 5 | 5 | 8.9 | 5 | 1.1 |
| Example 87 | 3 | 4 | 4 | 9.7 | 4 | 1.9 |
| Example 88 | 4 | 4 | 4 | 8.9 | 3 | 2.3 |

As seen from the Table 23, the secondary batteries according to Examples of 83 to 88 are capable of inhibiting an increase of internal pressure in the process of charging/discharging cycles, and at the same time capable of realizing a high capacity, a high battery voltage and a longer cycle life of charging/discharging. In particular, the secondary batteries of Examples 83 to 86 are longer in cycle life of charging/discharging, and lower in internal pressure as compared with Examples 87 and 88.

As seen from the Table 24, the positive electrodes of Examples 83 to 88 are high in water absorption, highly resistive to the swelling after water absorption and high in strength. The pastes of Examples 83 to 86 are more excellent in dispersion stability and adhesion as compared with Examples 87 and 88. This can be attributed to the fact that Examples 83 to 86 employ, as a binder for positive electrode, the copolymer consisting of a maleic acid unit and a vinyl alcohol unit, and having a cumulative 10% particle diameter D10 falling in the range of 1 to 20 μm and a cumulative 50% particle diameter D50 falling in the range of 5 to 50 μm and meeting the condition of D10<D50.

(3) an alkaline secondary battery provided with a positive electrode and a negative electrode, each comprising as a binder a copolymer consisting of a vinyl alcohol unit and a unit having COOX group

EXAMPLES 90 to 93

(Preparation of a paste-type positive electrode)

To 90 parts by weight of nickel hydroxide powder were added 10 parts by weight of cobalt monoxide and a binder comprising a various kinds of compounds at mixing ratios as indicated in Table 25. To this mixture was added 60 parts by weight of demineralized water, and the resultant mixture was kneaded to prepare a paste. This paste was then filled into a conductive substrate formed of a metallic porous body consisting of nickel-plated fibers and then the same paste was coated over the both surfaces of the substrate. After being dried, the substrate was roll-pressed to obtain a paste-type positive electrode having a thickness of 0.6 mm and a capacity per unit volume of 670 mAH/cc.

As for the copolymer particles consisting of a sodium acrylate unit and a vinyl alcohol unit, SUMIKA-GEL SP-520 (a trade name; Sumitomo Kagaku Kogyo Co., Ltd.) was employed. This copolymer particles were found to have a cumulative 10% particle diameter D10 of 5 μm and a cumulative 50% particle diameter D50 of 12 μm as measured by way of a laser diffraction scattering method. The water-absorbing ability of this copolymer particles was found to be 500 g/g. Further, when a 1 wt. % aqueous solution was prepared from the copolymer particles, the viscosity of the aqueous solution was found to be 1,500 cp.

As for the copolymer particles consisting of a maleic acid unit and a vinyl alcohol unit, AQUA-RESERVE GP (a trade name; Nihon Gosei Kagaku Kogyo Co., Ltd.) was employed. This copolymer particles were found to have a cumulative 10% particle diameter D10 of 5 μm and a cumulative 50% particle diameter D50 of 12 μm as measured by way of a laser diffraction scattering method. The water-absorbing ability of this copolymer particles was found to be 500 g/g. Further, when a 1 wt. % aqueous solution was prepared from the copolymer particles, the viscosity of the aqueous solution was found to be 1,500 cp.

(Preparation of a paste-type negative electrode)

To 100 parts by weight of the hydrogen-absorbing alloy powder prepared as shown in Examples 1 to 15 were mixed and kneaded with 1.0 part by weight of carbon black, 50 parts by weight of water and a binder comprising a various kinds of compounds at mixing ratios as indicated in Table 25, thereby preparing a paste. This paste was coated over a perforated metal, and after being dried, press-molded to form a negative electrode.

with respect to the copolymer comprising a sodium acrylate unit and a vinyl alcohol unit, and to the copolymer comprising a maleic acid unit and a vinyl alcohol unit, the same kinds of copolymers as used for the positive electrode were employed.

A separator of the same type as used in Examples 1 to 15 was disposed between the negative electrode and the positive electrode, and the resultant composite was spirally wound to form an electrode group. This electrode group was housed in a cylindrical case of AA size, and an electrolyte of the same composition as used in Examples 1 to 15 was poured into the cylindrical case. After sealing the inlet port, a cylindrical alkaline secondary battery having a capacity of 1,000 and constructed as shown in FIG. 1 was assembled.

The secondary batteries prepared according to Examples 90 to 93 were subjected to an aging at a temperature of 45° C. for 24 hours, and then to the initial charging thereby conditioning the batteries.

These batteries of Examples 90 to 93 conditioned through the initial charging were subjected to seven cycles of charge/discharge wherein each battery was charged to a depth of 150% with 1 C and then discharged with a cut of 1 C/1.0 V. Additionally, these batteries were subjected to ten cycles of charge/discharge wherein each battery was charged to a depth of 480% with 1 C and then discharged with a cut of 1 C/1.0 V. At this tenth cycle, the internal pressure, discharge capacity and battery voltage were measured, the results being illustrated in Table 26 shown below.

In another test, the batteries of Examples 90 to 93 conditioned through the initial charging were subjected to cycles of charge/discharge wherein each battery was charged to a depth of 150% with 1 C and then discharged with a cut of 1 C/1.0 V until the discharge capacity became lowered down to 800 mA or less, and the number of the cycles required for reaching to this value was measured, the results being shown in Table 26.

TABLE 25

| | Positive Electrode | | Negative Electrode | |
|---|---|---|---|---|
| | Kinds of Binder | Content (wt. parts) | Kinds of Binder | Content (wt. parts) |
| Example 90 | Copolymer of Sodium Acrylate/ | 0.5 | Copolymer of Sodium Acrylate/ | 0.5 |

TABLE 25-continued

| | Positive Electrode | | Negative Electrode | |
|---|---|---|---|---|
| | Kinds of Binder | Content (wt. parts) | Kinds of Binder | Content (wt. parts) |
| Example 91 | Vinyl Alcohol Copolymer of Maleic Acid/ Vinyl Alcohol | 0.5 | Vinyl Alcohol Copolymer of Maleic Acid/ Vinyl Alcohol | 0.5 |
| Example 92 | Copolymer of Maleic Acid/ Vinyl Alcohol | 0.7 | Copolymer of Maleic Acid/ Vinyl Alcohol | 0.3 |
| Example 93 | Copolymer of Sodium Acrylate/ Vinyl Alcohol | 0.5 | Copolymer of Maleic Acid/ Vinyl Alcohol | 0.5 |
| | PTFE | 1.0 | CMC | 0.125 |
| | CMC | 0.125 | — | — |

TABLE 26

| | Properties of Battery | | | |
|---|---|---|---|---|
| | Internal pressure ($kg/cm^2$) | Capacity (mAH) | Voltage (V) | Cycle Life (cycles) |
| Example 90 | 2.0 | 1190 | 1.220 | 430 |
| Example 91 | 1.9 | 1200 | 1.218 | 440 |
| Example 92 | 1.8 | 1180 | 1.218 | 460 |
| Example 93 | 1.9 | 1180 | 1.216 | 450 |

As seen from the Table 26, the secondary batteries according to Examples of 90 to 93 are high in battery voltage, larger in capacity, lower in internal pressure and longer in cycle life of charging/discharging as compared with those of Examples 1 to 88. This can be attributed to the fact that the copolymers consisting of a vinyl alcohol unit and a unit having COOX group were employed as a binder for both positive electrodes and negative electrodes in Examples 90 to 93.

In the above examples, this invention has been explained with reference to a cylindrical alkaline secondary battery. However, it is also possible to apply this invention to a rectangular alkaline secondary battery. Further, the shape of the electrode group to be housed in a case for the secondary battery is not restricted to a spiral shape as set forth in the above examples, but may be a laminate wherein a positive electrode, a separator and a negative electrode are superposed in this order.

As explained above, it is possible according to this invention to provide an alkaline secondary battery which is capable of inhibiting an increase of internal pressure in the process of charging/discharging cycles, and to extend the cycle life of charging/discharging.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An alkaline secondary battery comprising;

a case;

a paste-type positive electrode accommodated in said case and essentially consisting of a conductive substrate filled with a paste containing an active material and a binder;

a negative electrode accommodated in said case;

a separator accommodated in said case in such a manner as to be interposed between said positive electrode and said negative electrode; and an alkaline electrolyte accommodated in said case;

wherein said binder in said positive electrode contains a copolymer consisting of a vinyl alcohol unit and a unit having COOX group, wherein x is an element selected from the group consisting of hydrogen, alkaline metals and alkaline earth metals.

2. The alkaline secondary battery according to claim 1, wherein said copolymer is of particulate form.

3. The alkaline secondary battery according to claim 2, wherein said copolymer particles have a cumulative 10% particle diameter D10 ranging from 1 to 20 μm and a cumulative 50% particle diameter D50 ranging from 5 to 50 μm.

4. The alkaline secondary battery according to claim 1, wherein said unit having COOX is acrylic acid, maleic acid, fumaric acid, acrylate, maleate or fumarate.

5. The alkaline secondary battery according to claim 1, wherein said copolymer is of a three-dimensional crosslinking structure.

6. The alkaline secondary battery according to claim 5, wherein said copolymer is capable of absorbing water in an amount of 100 g/g to 800 g/g.

7. The alkaline secondary battery according to claim 1, wherein said copolymer is one whose 1 wt. % aqueous solution has a viscosity of 20,000 cp or less.

8. The alkaline secondary battery according to claim 1, wherein said binder in said positive electrode consists of said copolymer.

9. The alkaline secondary battery according to claim 8, wherein said paste contains 0.2 to 10 parts by weight of said copolymer per 100 parts by weight of said active material.

10. The alkaline secondary battery according to claim 1, wherein said binder in said positive electrode consists of said copolymer, polytetrafluoroethylene, and at least one polymer selected from the group consisting of carboxymethyl cellulose, methyl cellulose and polyvinyl alcohol.

11. The alkaline secondary battery according to claim 10, wherein said paste contains 0.05 to 5 parts by weight of said copolymer per 100 parts by weight of said active material and 0.1 to 5 parts by weight of said polytetrafluoroethylene and said polymer per 100 parts by weight of said active material.

12. The alkaline secondary battery according to claim 1, wherein said active material is a nickel compound.

13. The alkaline secondary battery according to claim 12, wherein said nickel compound is nickel hydroxide.

14. The alkaline secondary battery according to claim 1, wherein said conductive substrate is formed of a porous body consisting of metallic fiber.

15. The alkaline secondary battery according to claim 1, wherein said negative electrode contains a hydrogen-absorbing alloy.

16. An alkaline secondary battery comprising;

a case;

a positive electrode accommodated in said case;

a paste-type negative electrode accommodated in said case and essentially consisting of a conductive substrate filled with a paste containing an active material and a binder;

a separator accommodated in said case in such a manner as to be interposed between said positive electrode and said negative electrode; and an alkaline electrolyte accommodated in said case;

wherein said binder in said negative electrode contains a copolymer consisting of a vinyl alcohol unit and a unit having COOX group, wherein X is an element selected from the group consisting of hydrogen, alkaline metals and alkaline earth metals.

17. The alkaline secondary battery according to claim 16, wherein said copolymer is of particulate form.

18. The alkaline secondary battery according to claim 17, wherein said copolymer particles have a cumulative 10% particle diameter D10 ranging from 1 to 20 μm and a cumulative 50% particle diameter D50 ranging from 5 to 50 μm.

19. The alkaline secondary battery according to claim 16, wherein said unit having COOX is acrylic acid, maleic acid, fumaric acid, acrylate, maleate or fumarate.

20. The alkaline secondary battery according to claim 16, wherein said copolymer is of a three-dimensional crosslinking structure.

21. The alkaline secondary battery according to claim 20, wherein said copolymer is capable of absorbing water in an amount of 100 g/g to 800 g/g.

22. The alkaline secondary battery according to claim 16, wherein said copolymer is one whose 1 wt. % aqueous solution has a viscosity of 20,000 cp or less.

23. The alkaline secondary battery according to claim 16, wherein said binder in said negative electrode consists of said copolymer.

24. The alkaline secondary battery according to claim 23, wherein said paste contains 0.5 to 2.0 parts by weight of said copolymer per 100 parts by weight of said active material.

25. The alkaline secondary battery according to claim 16, wherein said binder in said negative electrode consists of said copolymer, and at least one polymer selected from the group consisting of carboxymethyl cellulose, methyl cellulose and polyvinyl alcohol.

26. The alkaline secondary battery according to claim 25, wherein said paste contains 0.05 to 2.0 parts by weight of said copolymer per 100 parts by weight of said active material and 0.1 to 3.0 parts by weight of said polymer per 100 parts by weight of said active material.

27. The alkaline secondary battery according to claim 16, wherein said active material is a hydrogen-absorbing alloy.

28. The alkaline secondary battery according to claim 27, wherein said hydrogen-absorbing alloy is represented by a formula of $LnNi_xMn_yAz$, wherein Ln represents lanthanum-rich misch metal, A represents at least one element selected from Al and Co, x, y and z are number which meets an equation of $4.8<x+y+z<5.4$.

29. The alkaline secondary battery according to claim 16, wherein said conductive substrate is formed of a perforated metal.

30. The alkaline secondary battery according to claim 16, wherein said positive electrode contains a nickel compound.

31. An alkaline secondary battery comprising;
   a case;
   a paste-type positive electrode accommodated in said case and essentially consisting a conductive substrate filled with a paste containing an active material and a binder;
   a paste-type negative electrode accommodated in said case and essentially consisting of a conductive substrate filled with a paste containing an active material and a binder;
   a separator accommodated in said case in such a manner as to be interposed between said positive electrode and said negative electrode; and
   an alkaline electrolyte accommodated in said case;
   wherein said binder in said positive electrode and said binder in said negative electrode contain a copolymer consisting of a vinyl alcohol unit and a unit having COOX group, wherein x is an element selected from the group consisting of hydrogen, alkaline metals and alkaline earth metals, respectively.

32. The alkaline secondary battery according to claim 31, wherein said copolymer is of particulate form.

33. The alkaline secondary battery according to claim 32, wherein said copolymer particles have a cumulative 10% particle diameter D10 ranging from 1 to 20 μm and a cumulative 50% particle diameter D50 ranging from 5 to 50 μm.

34. The alkaline secondary battery according to claim 31, wherein said unit having COOX is acrylic acid, maleic acid, fumaric acid, acrylate, maleate or fumarate.

35. The alkaline secondary battery according to claim 31, wherein said copolymer is of a three-dimensional crosslinking structure.

36. The alkaline secondary battery according to claim 35, wherein said copolymer is capable of absorbing water in an amount of 100 g/g to 800 g/g.

37. The alkaline secondary battery according to claim 31, wherein said copolymer is one whose 1 wt. % aqueous solution has a viscosity of 20,000 cp or less.

38. The alkaline secondary battery according to claim 31, wherein said binder in said positive electrode consists of said copolymer.

39. The alkaline secondary battery according to claim 38, wherein said paste contains 0.2 to 10 parts by weight of said binder per 100 parts by weight of said active material.

40. The alkaline secondary battery according to claim 31, wherein said binder in said positive electrode consists of said copolymer, polytetrafluoroethylene, and at least one polymer selected from the group consisting of carboxymethyl cellulose, methyl cellulose and polyvinyl alcohol.

41. The alkaline secondary battery according to claim 40, wherein said paste contains 0.05 to 5 parts by weight of said copolymer per 100 parts by weight of said active material and 0.1 to 5 parts by weight of said polytetrafluoroethylene and said polymer per 100 parts by weight of said active material.

42. The alkaline secondary battery according to claim 31, wherein said binder in said negative electrode consists of said copolymer.

43. The alkaline secondary battery according to claim 42, wherein said paste contains 0.5 to 2.0 parts by weight of said copolymer per 100 parts by weight of said active material.

44. The alkaline secondary battery according to claim 31, wherein said binder in said negative electrode consists of said copolymer, and at least one polymer selected from the group consisting of carboxymethyl cellulose, methyl cellulose and polyvinyl alcohol.

45. The alkaline secondary battery according to claim 44, wherein said paste contains 0.05 to 2.0 parts by weight of said copolymer per 100 parts by weight of said active material and 0.1 to 3.0 parts by weight of said polymer per 100 parts by weight of said active material.

46. The alkaline secondary battery according to claim 31, wherein said active material for said positive electrode is a nickel compound.

47. The alkaline secondary battery according to claim 46, wherein said nickel compound is nickel hydroxide.

48. The alkaline secondary battery according to claim 31, wherein said conductive substrate for said positive electrode is formed of a porous body consisting of metallic fiber.

49. The alkaline secondary battery according to claim 31, wherein said active material for said negative electrode is a hydrogen-absorbing alloy.

50. The alkaline secondary battery according to claim 49, wherein said hydrogen-absorbing alloy is represented by a formula of $LnNi_xMn_yA_z$ wherein Ln represents lanthanum-rich misch metal, A represents at least one element selected from Al and Co, x, y and z are number which meets an equation of $4.8 < x+y+z < 5.4$.

51. The alkaline secondary battery according to claim 31, wherein said conductive substrate for said negative electrode is formed of a perforated metal.

* * * * *